US007580560B2

(12) United States Patent
Bryll

(10) Patent No.: US 7,580,560 B2
(45) Date of Patent: Aug. 25, 2009

(54) SYSTEM AND METHOD FOR FAST TEMPLATE MATCHING BY ADAPTIVE TEMPLATE DECOMPOSITION

(75) Inventor: Robert K. Bryll, Bothell, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 777 days.

(21) Appl. No.: 11/184,185

(22) Filed: Jul. 18, 2005

(65) Prior Publication Data

US 2007/0014467 A1    Jan. 18, 2007

(51) Int. Cl.
*G06K 9/00* (2006.01)
(52) U.S. Cl. ...................................... 382/152; 382/209
(58) Field of Classification Search ........................ None
See application file for complete search history.

(56) References Cited

U.S. PATENT DOCUMENTS

| | | | | |
|---|---|---|---|---|
| 4,648,053 | A * | 3/1987 | Fridge | 382/147 |
| 5,465,303 | A * | 11/1995 | Levison et al. | 382/124 |
| 6,064,747 | A * | 5/2000 | Wills et al. | 382/100 |
| 6,072,905 | A | 6/2000 | Cucchi et al. | |
| 6,128,047 | A | 10/2000 | Chang et al. | |
| 6,542,180 | B1 | 4/2003 | Wasserman et al. | |
| 6,636,634 | B2 * | 10/2003 | Melikian et al. | 382/217 |
| 6,968,085 | B2 * | 11/2005 | Bern et al. | 382/218 |
| 7,369,687 | B2 * | 5/2008 | Kawato et al. | 382/118 |

OTHER PUBLICATIONS

U.S. Appl. No. 10/978,227, filed Oct. 29, 2004, Bryll.

Fok, Y.-H., and Au, O., "A Fast Block Matching Algorithm in Feature Domain," *Proceedings of the IEEE Workshop on Visual Signal Processing and Communications*, Melbourn, Sep. 21-23,1993, pp. 199-202.

Hodges, S. and Richards, B., "Faster Spatial Image Processing Using Partial Summation," *Technical Report CUED/F-INFENG/TR.245*, Cambridge University Engineering Department, Jan. 1996.

Kim, J.-S., and Park, R.-H., "A Two-Stage Fast Block Matching Algorithm Using Integral Projections," *Journal of Visual Communication and Image Representation 4* (4): 336-348, 1993.

Muramatsu, S., and Kobayashi, Y., "An Image Pattern Search Method Based on DP Matching for Detecting Accurate Pattern Positions," *Systems and Computer in Japan 29* (4): 22-32, 1998.

(Continued)

*Primary Examiner*—Matthew C Bella
*Assistant Examiner*—Alex Liew
(74) *Attorney, Agent, or Firm*—Christensen O'Connor Johnson Kindness PLLC

(57) ABSTRACT

A fast template matching method by adaptive template decomposition is provided. The template decomposition technique subdivides a template into a number of horizontal and/or vertical subdivisions and one-dimensional characterizations are determined for the subdivisions. The template decomposition may be adapted during learn mode operations of a general-purpose precision machine vision inspection system, with the support of corresponding user interfaces. The matching results for one or more template decomposition configurations may be evaluated by a user, or by an automatic decomposition configuration evaluation routine, to determine a configuration that provides a desirable trade-off between speed and matching position accuracy. Automatic workpiece inspection instructions may implement the configuration to repeatedly provide optimum speed versus accuracy trade-offs during run mode operations of the inspection system.

18 Claims, 10 Drawing Sheets

OTHER PUBLICATIONS

*QVPAK 3D CNC Vision Measuring Machine Operation Guide,*. Version 2.0, Manual No. 4911GB, Series No. 359, Mitutoyo Corporation & Micro Encoder Inc., Kanagawa, Japan, Sep. 1996.

*QVPAK 3D CNC Vision Measuring Machine User's Guide*, Version 7.0, 1st ed., Manual No. 99MCB225A, Series No. 359, Mitutoyo Corporation & Micro Encoder Inc., Kanagawa, Japan, Jan. 2003.

* cited by examiner

SYSTEM AND METHOD FOR FAST TEMPLATE MATCHING BY ADAPTIVE TEMPLATE DECOMPOSITION

FIELD OF THE INVENTION

The invention relates generally to methods for operating a machine vision inspection system with a camera and stage that are movable relative to one another in multiple directions so as to scan and inspect selected features (or patterns) of a workpiece on the stage, and more particularly to systems and methods that adaptively decompose a 2D template (pattern) into multiple subdivisions and correlate them with a workpiece image for fast template matching and position determination (pattern search).

BACKGROUND OF THE INVENTION

Precision machine vision inspection systems (or "vision systems" in short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user, or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as template matching video tools.

A part program may include, among other operations, instructions for template matching (pattern search) to identify a predefined template (pattern) in a workpiece image. The operations may include precisely determining the position of the identified workpiece pattern. Currently, template matching is carried out based on a full 2D correlation type of method. Generally in the full 2D correlation type of template matching, to match (or search) a template of T by S pixels in an image of M by N pixels, the total number of pixel-based operations required is M*N*T*S, assuming no image scaling or sub-sampling is performed prior to matching. Thus, for an image of size 640×480 pixels and a template of size 70×70 pixels, as many as 1.5 billion pixel-based operations are required, which is significant even for contemporary processors. This may result in an undue slowdown of the matching process particularly for large templates, which are becoming common as the camera resolution increases.

U.S. Pat. No. 6,128,047, incorporated herein by reference in its entirety, describes a motion estimation process and system using sparse search block and integral projection. Using integral projection in template matching operations is known to provide substantial speed increases compared to full 2D correlation types of template matching. However, known types of template matching using integral projection lack robustness when certain types of patterns are to be matched. In particular, the loss of pattern information resulting from the formation of integral projections may lead to erroneous or insufficiently accurate template matching. Lack of template matching robustness and insufficiently accurate template position determination (that is, accurate determination of the workpiece feature that matches the template) are particular problems with respect to general-purpose precision machine vision inspection systems, which are expected to provide measurements that are accurate at the pixel or sub-pixel resolution level for a wide variety of workpiece features.

Accordingly, a need exists for a template matching method, which provides an increased speed advantage while also ensuring robust template matching and high accuracy template position results for a wide variety of workpiece features.

SUMMARY OF THE INVENTION

A method of template matching that combines integral projection techniques with a novel template decomposition technique is provided. The novel template decomposition technique subdivides the defined template into a number of segments that are sufficient to ensure robust template matching and high accuracy template position results for a wide variety of workpiece features, while doing so with reduced and/or approximately optimum processing time.

The template decomposition and/or certain types of filtering used with the method may be adapted during learn mode operations of a general-purpose precision machine vision inspection system, in a manner that depends on their ability to match specific workpiece features, if desired. During learn mode operations, the matching results for one or more template decomposition configurations may be evaluated by a user, or by an automatic decomposition configuration evaluation routine, to determine the decomposition configuration that provides a desirable trade-off between speed and matching robustness/matching position accuracy. The decomposition configuration that provides the desirable trade-off may then be incorporated into automatic workpiece inspection instructions (i.e., into a part program), to repeatedly provide optimum speed versus robustness and/or accuracy trade-offs during run mode operations of the precision machine vision inspection system.

In accordance with one aspect of the invention, the template decomposition configuration or the number of horizontal and vertical template subdivisions to be produced may be determined based on one of: a) a desired maximum number of pixels in a subdivision based on user input, b) a desired number of subdivisions based on user input, c) a spatial frequency analysis performed on the template, or d) an analysis of diminishing improvements in template matching position robustness and/or accuracy as the number of subdivisions is increased.

In accordance with a further aspect of the invention, a horizontal projection of each horizontal template subdivision is correlated with a corresponding horizontally processed image of a workpiece (a "horizontal pseudo-image"), to provide a horizontal correlation sub-map. Similarly, a vertical projection of each vertical template subdivision is correlated with a corresponding vertically processed image (a "vertical pseudo-image") to produce a vertical correlation sub-map.

In accordance with a further aspect of the invention, all of the respective horizontal and vertical correlation sub-maps are combined (e.g., summed) to provide a full correlation map, and the full correlation map is analyzed to determine a template matching workpiece feature and/or position.

In accordance with a further aspect of the invention, in exemplary embodiments, the full correlation map may be analyzed by smoothing operations or other pre-processing, thresholding the resulting correlation map, performing a connected components analysis on the threshold-exceeding pixels of the correlation map to identify local sets or blobs of qualifying pixels (e.g., to reject unwanted instances of weak correlation), labeling each of the identified connected blobs, assigning strength values to the respective blobs based on their respective included correlation values, and selecting the strongest or sufficiently strong blob(s) as indicating a template matching workpiece feature.

In accordance with another aspect of the invention, during learn mode operations, after the respective horizontal and vertical correlation sub-maps are combined to form a full correlation map usable to identify a template matching workpiece feature, one or more of the correlation sub-maps are selectively combined to determine if a reduced number of sub-maps can be combined to provide a correlation map that sufficiently closely corresponds to the full map. If a combination of less than all of the correlation sub-maps is found to sufficiently closely correspond to the full map, then such a combination of sub-maps may be used for further analysis instead of the full correlation map and processing of the horizontal or vertical template projections corresponding to the unused sub-maps may be abandoned in subsequent template matching operations, to increase the speed advantage of the method.

In accordance with another aspect of the invention, a determined template matching position may used to display the template pattern overlaid on a real-time display of the workpiece feature in a corresponding position, during learn mode operations, and the user determines whether the determined template matching position is acceptable. The template matching position may also, or alternatively, be displayed as a numerical coordinate result. If the user determines that a determined template matching position is unacceptable, at least one of the number of horizontal and vertical template subdivisions may be increased, and the template matching operations may be repeated based on the increased number of template subdivisions. If the user determines that a determined template matching position is acceptable, the corresponding number of horizontal and vertical template subdivisions, as well as any other corresponding template matching parameters used to determine the template matching position, may be incorporated into a part program to be used for inspecting the corresponding workpiece during run mode operations.

In accordance with another aspect of the invention, during learn mode operations, the user may "step through" a plurality of respective displays of the determined template matching position results corresponding to respective numbers of template decomposition subdivisions and observe the corresponding respective template matching position(s) overlaid on a real-time display of the workpiece feature (and/or the corresponding numerical coordinate results), and accept or reject each result. In accordance with a further aspect of the invention, the minimum number of subdivisions corresponding to one or more accepted results may be automatically identified and incorporated into a part program to be used for inspecting a corresponding workpiece during run mode operations.

In accordance with another aspect of the invention, currently-defined template decomposition subdivisions are displayed in association with a template definition tool that is displayed during learn mode operations. In accordance with a further aspect of the invention, the template definition tool includes means for the user to adjust the template decomposition subdivisions, and the adjusted template decomposition subdivisions are displayed.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
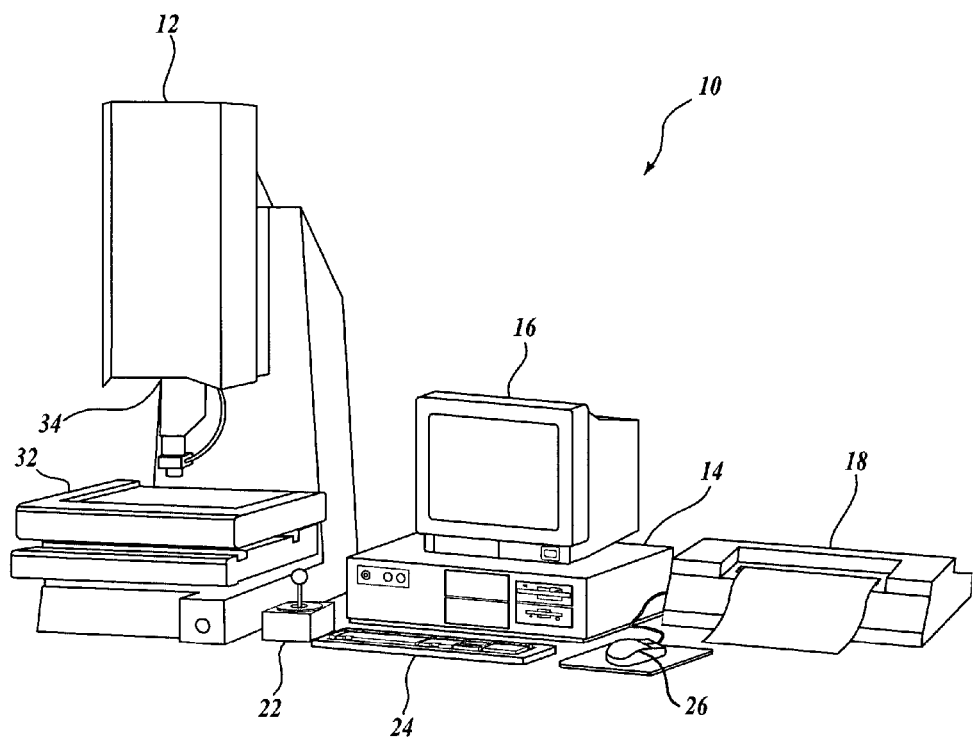
FIG. 1 is a diagram showing various typical components of a general-purpose machine vision inspection system.

FIG. 1 is a block diagram of one exemplary machine vision inspection system 10 in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor 16, a printer 18, a joystick 22, a keyboard 24, and a mouse 26. The monitor or display 16, may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISIONS® series of vision systems and the QVPAK® software discussed above, and similar state-of-the-art commercially available precision machine vision inspection systems. The machine vision inspection system 10 is also described in U.S. patent application Ser. No. 10/978,227, which is incorporated herein by reference.

Figure 2:
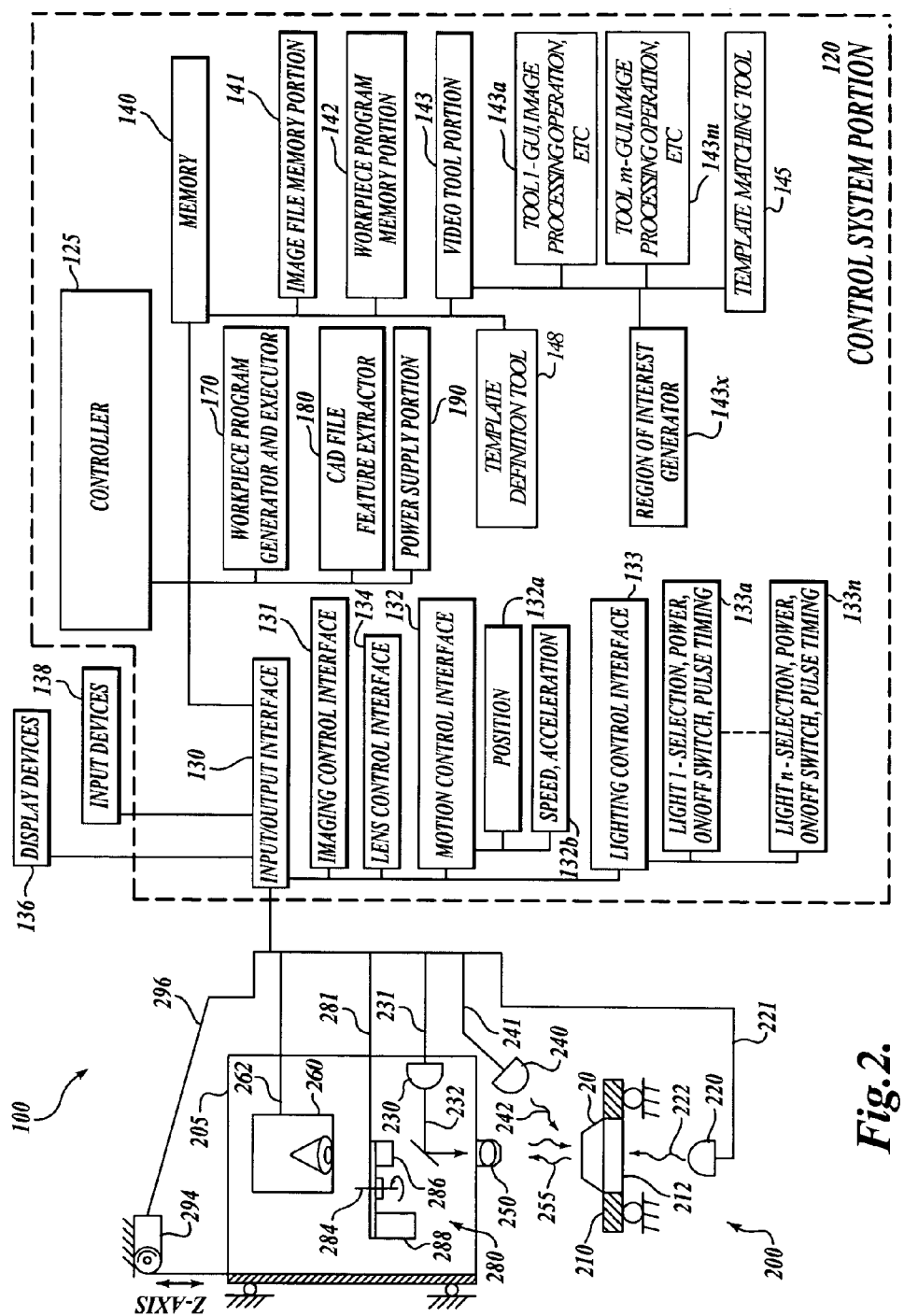
FIG. 2 is a diagram of a control system portion and a vision components portion of a machine vision inspection system.

FIG. 2 is a diagram of a control system portion 120 and a vision components portion 200 of a machine vision inspection system 100 in accordance with the present invention. As will be described in more detail below, the control system portion 120 is utilized to control the vision components portion 200. The vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera system 260, an interchangeable objective lens 250, and may include a turret lens assembly 280, and the coaxial light source 230. Alternatively to the turret lens assembly, a fixed or manually interchangeable magnification-altering lens, or a zoom lens configuration, or the like, may be included. The optical assembly portion 205 is controllably movable along a Z axis that is generally orthogonal to the X and Y axes, by using a controllable motor 294, as described further below.

A workpiece 20 that is to be imaged using the machine vision inspection system 100 is placed on the workpiece stage 210. One or more of the light sources 220, 230 and 240 emits source light 222, 232, or 242, respectively, that is usable to illuminate the workpiece 20. Light emitted by the light sources 220, 230 and/or 240 illuminates the workpiece 20 and is reflected or transmitted as workpiece light 255, which passes through the interchangeable objective lens 250 and the turret lens assembly 280 and is gathered by the camera system 260. The image of the workpiece 20, captured by the camera system 260, is output on a signal line 262 to the control system portion 120.

The light sources 220, 230, and 240 that are used to illuminate the workpiece 20 can include a stage light 220, a coaxial light 230, and a surface light 240, such as a ring light or a programmable ring light, all connected to the control system portion 120 through signal lines or busses 221, 231 and 241, respectively. As a primary optical assembly of the machine vision inspection system 100, the optical assembly portion 205 may include, in addition to the previously discussed components, other lenses, and other optical elements such as apertures, beam-splitters and the like, such as may be needed for providing coaxial illumination, or other desirable machine vision inspection system features. When it is included as a secondary optical assembly of the machine vision inspection system 100, the turret lens assembly 280 includes at least a first turret lens position and lens 286 and a second turret lens position and lens 288. The control system portion 120 rotates the turret lens assembly 280 along axis 284, between at least the first and second turret lens positions, through a signal line or bus 281.

The distance between the workpiece stage 210 and the optical assembly portion 205 can be adjusted to change the focus of the image of the workpiece 20 captured by the camera system 260. In particular, in various exemplary embodiments, the optical assembly portion 205 is movable in the vertical Z axis direction relative to the workpiece stage 210 using a controllable motor 294 that drives an actuator, a connecting cable, or the like, to move the optical assembly portion 205 along the Z axis. The term Z axis, as used herein, refers to the axis that is intended to be used for focusing the image obtained by the optical assembly portion 205. The controllable motor 294, when used, is connected to the input/output interface 130 via a signal line 296.

As shown in FIG. 2, in various exemplary embodiments, the control system portion 120 includes a controller 125, an input/output interface 130, a memory 140, a workpiece program generator and executor 170, a CAD file feature extractor 180, and a power supply portion 190. It will be appreciated that each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 includes a position control element 132a, and a speed/acceleration control element 132b. However, it should be appreciated that in various exemplary embodiments, such elements may be merged and/or indistinguishable. The lighting control interface 133 includes lighting control elements 133a-133n which control, for example, the selection, power, on/off switch, and strobe pulse timing if applicable, for the various corresponding light sources of the machine vision inspection system 100, such as the light sources 220, 230, and 240.

The memory 140 includes an image file memory portion 141, a workpiece program memory portion 142 that may include one or more part programs, or the like, and a video tool portion 143. The video tool portion 143 includes tool portions 143a-143m, which determine the GUI, image processing operations, etc., for each of the corresponding tools. In various exemplary embodiments of the present invention, the video tool portion 143 also includes a template definition tool 148, which determines the GUI, image processing operations, etc., for defining a template according to an adaptive template decomposition technique, to be used during learn mode operations of a machine vision inspection system. The video tool portion 143 further includes a template matching tool 145, which stores the results of the template decomposition performed by the template definition tool 148 (i.e., the horizontal and/or vertical template subdivisions identified by the template definition tool 148), as well as any other template matching parameters, to be used for inspecting corresponding workpieces during run mode operations (and also during learn mode operations in a "test" run). The video tool portion 143 still further includes a region of interest generator 143x that supports automatic, semi-automatic and/or manual operations that define various regions of interest that are operable in various video tools included in the video tool portion 143. In general, the memory portion 140 stores data usable to operate the vision system components portion 200 to capture or acquire an image of the workpiece 20 such that the acquired image of the workpiece 20 has desired image characteristics. The memory portion 140 further stores data usable to operate the machine vision inspection system 100 to perform various inspection and measurement operations on the acquired images, either manually or automatically, and to output the results through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 and one or more input devices 138 can also be connected to the input/output interface 130. The display devices 136 and input devices 138 can be used to view, create and/or modify part programs, to view the images captured by the camera system 260, and/or to directly control the vision system components portion 200. In a fully automated system having a predefined part program (or workpiece program), the display devices 136 and/or the input devices 138 may be omitted.

With regard to the CAD file feature extractor 180, information, such as a CAD file representing a workpiece is frequently available in industrial applications of machine vision inspection systems. The locations of edges, boundaries and/or workpiece feature patterns in the CAD file representation may be determined manually, in a semi-automated fashion, or fully automatically, and such information may be useful for workpiece part programming or navigating to a desired workpiece feature.

In various exemplary embodiments, when a user utilizes the machine vision inspection system 100 to create a workpiece image acquisition program for the workpiece 20, the user generates workpiece program instructions either by explicitly coding the instructions automatically, semi-automatically, or manually, using a workpiece programming language, or by generating the instructions by moving the machine vision inspection system 100 through an image acquisition training sequence such that the workpiece program instructions capture the training sequence. This process is repeated for multiple images in a set of images that are to be captured. These instructions, when executed, will cause the machine vision inspection system to manipulate the workpiece stage 210 and/or the camera system 260 at certain speed(s) such that a particular portion of the workpiece 20 is within the field of view of the camera system 260 and at a desired focus state for each of a set of images to be acquired. In addition to the program instructions that control the relative movement of the camera and the workpiece, the workpiece image acquisition program also needs to include program instructions that activate one or more of the light sources 220-240 to provide a desired illumination of the workpiece 20 during each image acquisition.

Once a set of workpiece image acquisition instructions are defined, in various exemplary embodiments of the present invention, the control system 120 executes the instructions and commands the camera system 260 to capture one or more images of the workpiece 20 according to the instructions. The control system 120 will then, under control of the controller 125, input the captured image(s) through the input/output interface 130 and store the captured image(s) in the memory 140. The controller 125 may also display the captured images on the display device 136.

The control system portion 120 is further usable to recall captured and stored workpiece inspection images, to inspect and analyze workpiece features in such workpiece inspection images, and to store and/or output the inspection results. These methods are typically embodied in various video tools included in the video tool portion 143 of the memory 140, such as the template matching tool 145, edge/boundary detection tools, dimension measuring tools, coordinate matching tools, and the like. Some of these tools are routinely used in a variety of commercially available machine vision inspection systems, such as the QUICK VISION® series of vision systems and the associated QVPAK® software.

After the image inspection/analysis operation using one or more of these video tools is completed, the control system 120 outputs the results of each analysis/inspection operation to the input/output interface for outputting to various display devices 136, such as a video display, printer, and the like. The control system 120 may also store the results of each inspection operation in the memory 140.

As discussed in the background section above, known full 2D correlation types of template matching may provide high accuracy template matching position results, but they are computationally intensive and this may be one factor that limits the inspection throughput of a machine vision system. A template matching method using known methods of integral projection, on the other hand, may be relatively faster that full 2D correlation, but it often lacks in robustness and/or fails to provide high accuracy template matching position results. In various exemplary embodiments of the present invention, a method of template matching is provided that combines integral projection techniques with a novel adaptive template decomposition technique. The method adaptively subdivides a template into a number of segments that is sufficient to provide a desirable trade-off between speed (template matching execution time) and template matching robustness and/or position accuracy.

Figure 3:
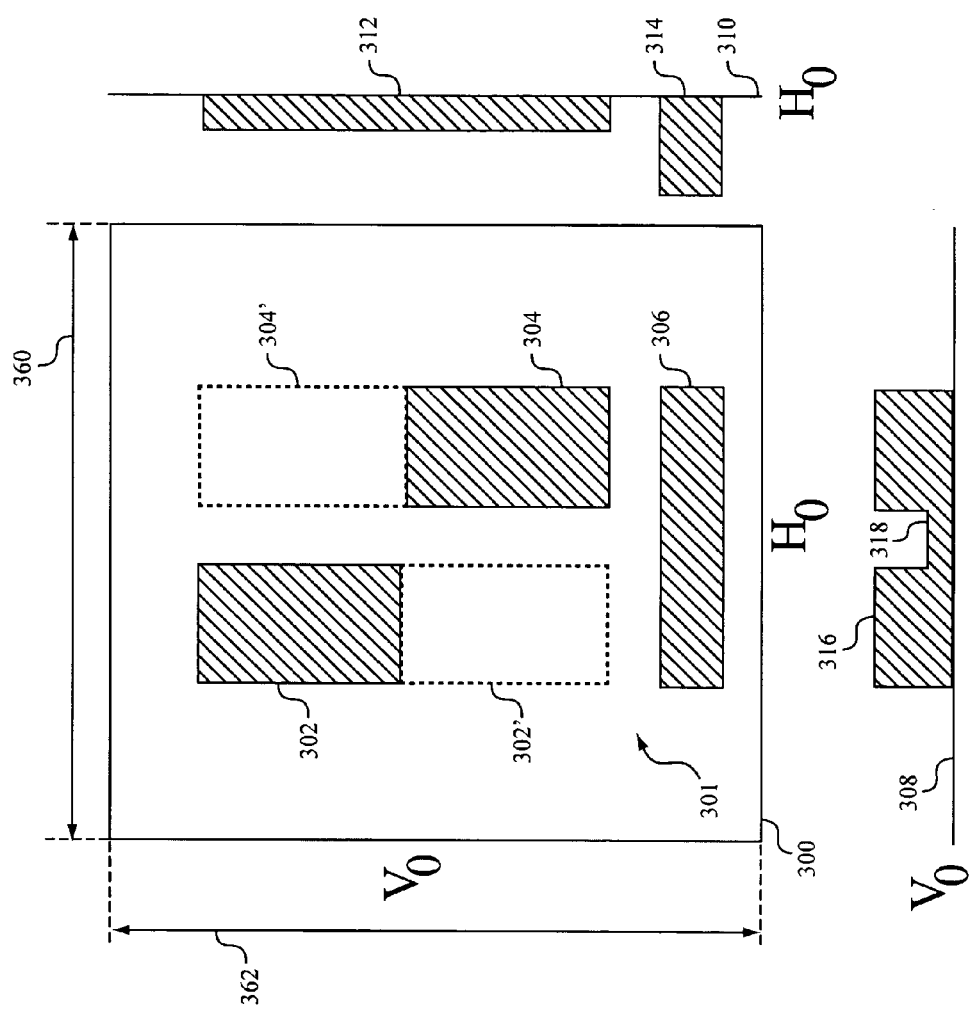
FIG. 3 is a diagram illustrating a template matching method using integral projection.
Figure 4:
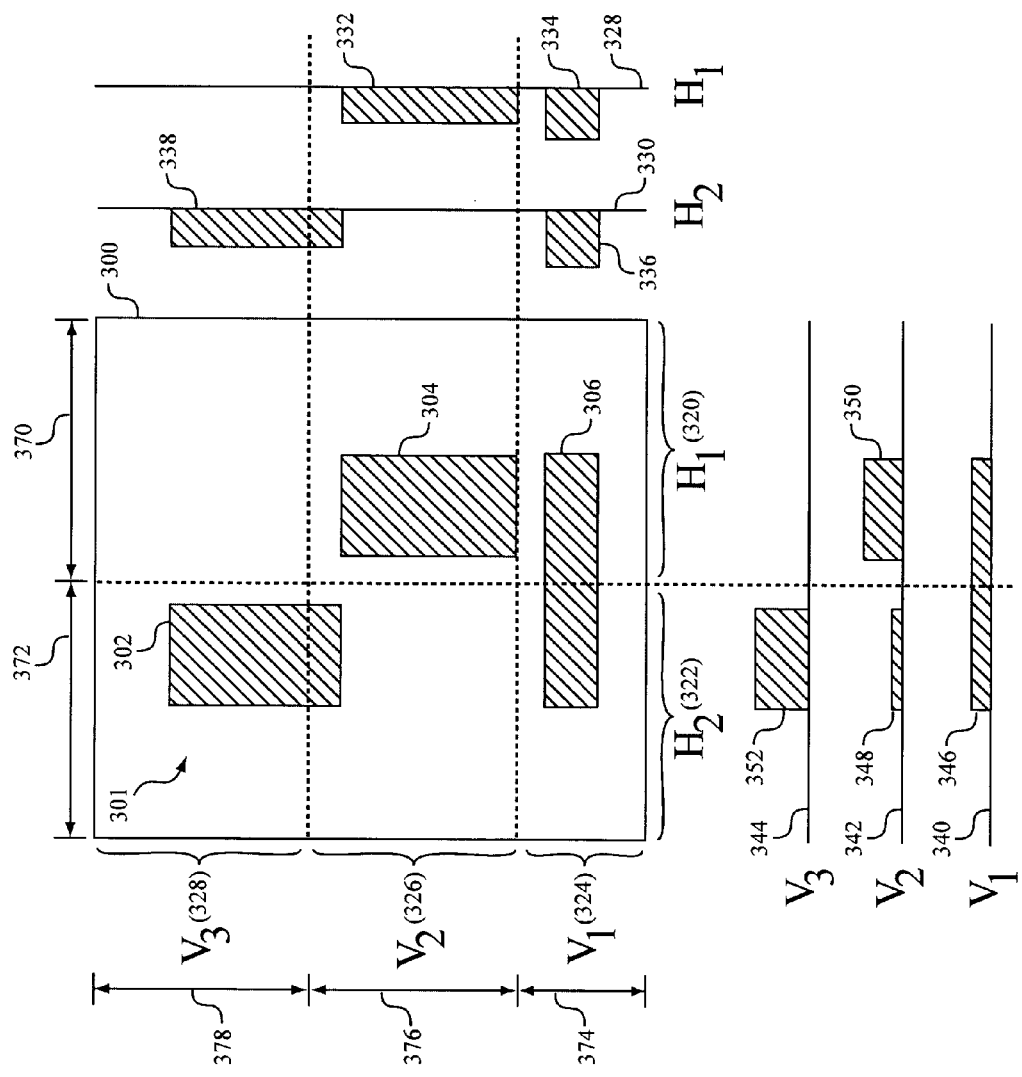
FIG. 4 is a diagram illustrating a fast template matching method by adaptive template decomposition according to one aspect of the present invention.

FIG. 3 illustrates the concept of template matching using integral projection, and FIG. 4 illustrates the concept of the novel adaptive template decomposition method, which incorporates the method of FIG. 3, according to one aspect of the present invention. As shown in FIG. 3, a template 300 may have a region of interest (ROI) size T×S (e.g., 50×55 pixels) and include a template feature 301. In the example shown in FIG. 3 the template 300 consists of three template feature portions 302, 304, and 306, which, for purposes of illustration, have a pixel intensity that is uniform. More generally, the grayscale (or color) intensity may vary throughout the template. The remainder of the ROI of the template 300, for purposes of illustration, is featureless and is assumed to have a pixel intensity of zero (which would be completely dark in an actual workpiece image.) The pixel intensity values within the ROI of the template 300 are vertically projected (that is, the pixel values are added along vertical columns) to form a vertical projection $V_0$ that is displayed on a vertical projection line 308, and the pixel intensity values within the ROI of the template 300 are horizontally projected ((that is, the pixel values are added along horizontal rows) to form a horizontal projection $H_0$ that is displayed on a horizontal projection line 310. In particular, since the background portion is assumed to contribute no pixel intensity values in this simplified example, the rows including the template feature portions 302 and 304 are horizontally projected to together form a horizontal projection portion 312, and the rows including the template feature portion 306 are horizontally projected to form a horizontal projection portion 314, and the projection portions 312 and 314 collectively form the horizontal projection $H_0$ on the horizontal projection line 310. Similarly, the columns including the template feature portions 302, 304, and 306 are vertically projected to together form the vertical projection $V_0$ comprising a vertical projection portion 316 on the vertical projection line 308. The vertical projection portion 316 includes a reduced section 318 because the template feature portions 302 and 304 are spaced apart and do not contribute to the vertical projection in the reduced section 318.

In the illustrated example, the projections $H_0$ and $V_0$ are averaged. For example, for the horizontal projection $H_0$, all the grayscale (or color) values of pixels in each horizontal row are summed (i.e., a corresponding lateral histogram is created), and the total sum is divided by the width dimension 360 of (or the number of pixels in) the horizontal row. Likewise, for the vertical projection $V_0$, all the grayscale (or color) values of pixels in each vertical column are summed (i.e., a corresponding lateral histogram is created), and the total sum is divided by the height dimension 362 of (or the number of pixels in) the vertical column. Alternatively, the lateral histograms themselves may be used as the projections, without dividing them by the width/height. There is no qualitative difference between using average projections and lateral histograms; average projections (or "integral projections") are simply scaled lateral histograms, which results in projection values that will not exceed the grayscale (or color scale) range. It should further be noted that various methods, other than the simple summation-based methods described above, may be used to produce 1D characterizations of the 2D template 300. Such methods may include, but are not limited to, weighted sums, Gaussian filtering, linear filtering with non-Gaussian weights, and non-linear filtering including median, max, and min filtering. Such characterizations may be used instead of simple summation-based 1D projections in the various exemplary methods disclosed herein.

After the horizontal and vertical projections $H_0$ and $V_0$ (or, more broadly, any horizontal and vertical 1D template characterizations) of the template 300 are obtained, the projections can be correlated with data based on an input image (e.g., a workpiece image) of size M×N (not shown), using any now-known or later-developed grayscale or color correlation method. Sample correlation measures applicable to similarly characterized input images include, but are not limited to, multiplicative correlation, sum of absolute differences (SAD), also known as absolute difference correlation (ADC), sum of squared differences (SSD), Euclidean distance (where the template is treated as a multidimensional vector), cosine measure using dot product (where the template and the image sub-region are treated as vectors), normalized grayscale correlation, and feature-based methods (i.e., correlating the numbers/positions of edge pixels). For color images/templates, template matching using one of the methods outlined above can be performed if the color channels of the image/template are combined using standard methods to form grayscale images before the 1D template representations are created. Alternatively, template matching using one of the methods outlined above can be done separately in each color channel of the image, and each color channel may return unique or duplicate template matches. The position values determined for templates matches that are duplicated for respective color channels may be combined by averaging, or weighted averaging (e.g., by weighting according to the strength of the respective correlation), for example. Alternatively, correlation maps can be determined separately for each color channel of the image and/or template, for example, using methods identical to any of the grayscale-based methods disclosed in this application, and the resulting correlation maps obtained for each color channel can be combined (e.g. added) to provide a full color-combined correlation map that is used similarly to the other full correlation map(s) described throughout this application.

It should be noted that, before the correlation operations are performed, the data based on the input image should be processed using a method identical or equivalent to that used to obtain the template projections (or 1D characterizations). For example, with respect to the template projections obtained as outlined with reference to FIG. 3, the input image may be filtered along the horizontal direction, e.g., by using an averaging kernel having a number of pixels corresponding to the template width dimension 360, for the pixels in each image row. In essence, in the same manner that the horizontal projection values are determined for the template, a "horizontal projection value" is determined for each pixel of the input image that has a sufficient number (e.g., a number corresponding to the width dimension 360) of horizontal neighbors. This process may be described as providing a "horizontal projection pseudo-image" or, more generally, a "horizontal pseudo-image" of the input image. Similarly, the input image may be filtered along the vertical direction, e.g., by using an averaging kernel having the template height dimension 362, for the pixels in each image column. In essence, in the same manner that the vertical projection values are determined for the template, a "vertical projection value" is determined for each pixel of the input image that has a sufficient number (e.g., a number corresponding to the height dimension 362) of vertical neighbors. This process may be described as providing a "vertical projection pseudo-image" or, more generally, a "vertical pseudo-image" of the input image. Then, the horizontal and vertical projections $H_0$ and $V_0$ of the template 300 are correlated to the horizontal and vertical projection pseudo-images, respectively, to produce horizontal and vertical correlation sub-maps as follows: For each pixel in a respective projection pseudo-image, the correlation value resulting from the correlation operation corresponding to that pixel location is assigned to that pixel position (x, y) in the correlation sub-map. Finally, the horizontal and vertical correlation sub-maps may be combined to create a full correlation map identifying the one or more sufficient or best correlations (e.g., the region(s) in the input image that is(are) "most similar" to the template.) The full correlation map can be further analyzed by thresholding, using a connected components analysis, etc., as described in greater detail below.

Regarding the correlation sub-maps, one or more correlation value peaks in the horizontal correlation sub-map will generally indicate the vertical position(s) where the horizontal projection $H_0$ matches the horizontal projection pseudo-image and, ideally, the vertical or y-coordinate position where the template 300 matches a feature in the input image. The vertical or y-coordinate position accuracy will generally be better than the horizontal or x-coordinate position determined from the horizontal correlation sub-map due to the fact that both the 1D horizontal template projection and the horizontal projection pseudo-images are horizontally blurred or filtered. Likewise, one or more correlation value peaks in the vertical correlation sub-map will generally indicate the horizontal position(s) where the vertical projection $V_0$ matches the vertical projection pseudo-image and, ideally, the horizontal or x-coordinate position where the template 300 matches a feature in the input image. The horizontal or x-coordinate position accuracy will generally be better than the vertical or y-coordinate position determined from the vertical correlation sub-map due to the fact that both the 1D vertical template projection and the vertical projection pseudo-images are vertically blurred or filtered. When the correlation sub-maps are combined (e.g., such that the results corresponding to congruent image pixels are added or superimposed at the corresponding pixel location), one or more correlation value peaks in the full correlation sub-map will generally indicate the (x,y) position(s) where the template 300 matches a feature in the input image.

In the background section above, it was discussed that the full 2D correlation type of template matching is computationally intensive, and generally requires M*N*T*S number of pixel-based operations in order to match (or search) a template of T by S pixels in an image of M by N pixels. In the method of template matching using integral projection, described above, the computation becomes less intensive. Specifically, for an image of size M by N pixels and a template of size T by S pixels, the approximate number of pixel-based operations required to compute the final (full) correlation map can be calculated based on the following:

1. T*S operations to obtain the horizontal template projection $H_0$.
2. T*S operations to obtain the vertical template projection $V_0$.
3. M*N*T operations to filter the input image horizontally (filter width T), to provide the horizontal projection pseudo-image.
4. M*N*S operations to filter the input image vertically (filter height S), to provide the vertical projection pseudo-image.
5. M*N*S operations to correlate the horizontal projection pseudo-image with the horizontal template projection $H_0$ to create a horizontal correlation sub-map.
6. M*N*T operations to correlate the vertical projection pseudo-image with the vertical template projection $V_0$ to create a vertical correlation sub-map.
7. M*N operations to combine the horizontal and vertical correlation sub-maps.

Therefore, the total number of operations to create a full correlation map is $2TS+2MN(T+S+\frac{1}{2})$. When compared to the full 2D correlation computation, the proportion in terms of the number of required operations is $[2TS+2MN(T+S+\frac{1}{2})]/(MNTS)$. The first component of the sum $(2TS)/(MNTS) \approx 0$, so it can be ignored. Also, $\frac{1}{2}$ can be ignored since $\frac{1}{2} << (T+S)$. Therefore, the final proportion becomes approximately $2(T+S)/(TS)$. In other words, the template matching method using integral projection may be performed approximately $(TS)/[2(T+S)]$ faster than the full 2D correlation type template matching method, which should provide actual improvement in template matching throughput for templates larger than 4×4 pixels.

However, the full correlation map obtained by a method using integral projection is only an approximation of the correlation map obtained by a full 2D correlation type method. Since the original 2D template is represented (or abstracted) by only two 1D projections (or 1D characterizations), the amount of information relevant to matching is drastically reduced and the combined results of the horizontal and vertical correlations can only roughly approximate the true 2D correlation. In short, prior art template matching using integral projection may provide a speed improvement, but it lacks in robustness when certain types of templates (patterns) are to be matched, and may produce erroneous matches (false positives, or false negatives) or insufficiently accurate template matching position results. One example of such problems may be described with reference to FIG. 3. It should be appreciated that if the template feature portions 302, 304, respectively, were rearranged to the positions 302', 304', respectively, as indicated by the dashed outlines in FIG. 3, then the horizontal and vertical projections $H_0$ and $V_0$ would be unchanged, despite a significant difference in the template pattern. The novel adaptive template decomposition technique described below overcomes such potential problems in an efficient and user-friendly manner.

FIG. 4 illustrates the concept of a novel adaptive template decomposition technique according to one aspect of the present invention, which provides both the speed advantages of an integral projection based method and the system robustness required to produce sufficiently accurate template matching results. The template 300 includes the same template feature 301, as in FIG. 3, consisting of the template feature portions 302, 304, and 306. In FIG. 4, however, the template 300 is divided into two horizontal template subdivisions 320 and 322, each extending through the vertical height of the template 300, and having subdivision dimensions 370 and 372, respectively. Likewise, the template 300 is divided into three vertical template subdivisions 324, 326, and 328, each extending through the horizontal width of the template 300, and having subdivision dimensions 374, 376 and 378, respectively.

The horizontal template subdivisions 320 and 322 are horizontally projected to form horizontal projections $H_1$ and $H_2$, respectively, that are displayed on horizontal projection lines 328 and 330, respectively. The horizontal projection $H_1$ consists of horizontal projection portions 332 and 334, which include the projection of the template feature portion 304 and a segment of the template feature portion 306 contained within the horizontal template subdivision 320. The horizontal projection $H_2$ consists of horizontal projection portions 336 and 338, including the projection of the template feature portion 302 and a segment of the template feature portion 306 contained within the horizontal template subdivision 322. The vertical template subdivisions 324, 326, and 328 are vertically projected to form vertical projections $V_1$, $V_2$, and $V_3$, respectively, that are displayed on vertical projection lines 340, 342, and 344, respectively. The vertical projection $V_1$ consists of a vertical projection portion 346 including the projection of the template feature portion 306 contained within the vertical template subdivision 324. The vertical projection $V_2$ consists of vertical projection portions 348 and 350 including the projection of the template feature portion 304 and a segment of the template feature portion 302 that are contained in the vertical template subdivision 326. Finally, the vertical projection $V_3$ consists of a vertical projection portion 352 including the projection of a segment of the template feature portion 302 that is contained within the vertical template subdivision 326.

As described above in reference to FIG. 3, various methods may be used to produce 1D characterizations of the 2D template 300. Similarly, various methods may be used to produce 1D characterizations of any 2D template subdivision, including, but not limited to, an image projection method (partial summation, lateral histograms), an averaged projection method (average filtering in vertical and horizontal directions), Gaussian filtering, linear filtering with non-Gaussian weights, and non-linear filtering including median, max, and min filtering. Such characterizations may be used instead of simple summation-based 1D projections in the various exemplary methods disclosed herein for template subdivision processing.

Similarly to the description above in reference to FIG. 3, before the correlation operations are performed using the respective template subdivision projections (or more generally, their 1D characterizations), for each respective correlation, data based on the input image should be processed using a method identical equivalent to that used to obtain the respective template projections (or 1D characterizations). For example, when the respective template horizontal subdivision projection H1 is an "averaged" projection, before the correlation operations are performed for the projection H1, the input image may be filtered along the horizontal direction using an averaging kernel having a width that is the same as the dimension 370, for each pixel that has a sufficient number of horizontal neighbors, to produce a horizontal projection that is appropriate for correlation to the projection H1. When the dimension 372, corresponding to the horizontal subdivision type H2, is the same as the dimension 370, then the same horizontal projections pseudo-image is appropriate for correlation to the projection H2. However, if the dimension 372 is different, then an appropriate pseudo-image must be provided by filtering the input image along the horizontal direction using an averaging kernel having a width that is the same as the dimension 372. Thus, to increase template matching throughput, if allowed by other considerations, it may be desirable for at least horizontal subdivision to have the same dimension, such that a single horizontal projection pseudo-image is appropriate for correlation with at least two of the individual horizontal subdivision projections of a template. Similar considerations apply to the processing and dimensions related to template vertical subdivisions. Thus, to increase template matching throughput, if allowed by other considerations, it may also be desirable for at least two vertical subdivisions to have the same dimension, as illustrated for the height dimensions 376 and 378, for example, such that a single vertical projection pseudo-image is appropriate for correlation with at least two individual vertical subdivision projections of a template. Of course, if allowed by other considerations, it is most advantageous if all horizontal subdivisions have the same dimension, and all vertical subdivisions have the same dimension.

Each of the respective horizontal projections $H_1$ and $H_2$ can then be correlated with a corresponding horizontally processed horizontal projection pseudo-image to produce a respective horizontal correlation sub-map. Likewise, each of the respective vertical projections $V_1$, $V_2$, and $V_3$ can be correlated with a corresponding vertically processed vertical projection pseudo-image to produce a respective vertical correlation sub-map. As before, any now-known or later-developed correlation measure may be used including, but not limited to, multiplicative correlation, sum of absolute differences (SAD) or absolute difference correlation (ADC), sum of squared differences (SSD), Euclidean distance (where the template is treated as a multidimensional vector), cosine measure using dot product (where the template and the image sub-region are treated as vectors), normalized grayscale correlation, and feature-based methods (i.e., correlating the numbers/positions of edge pixels). After the horizontal and vertical correlation sub-maps are produced based on the horizontal and vertical projections $H_1$, $H_2$, $V_1$, $V_2$, and $V_3$, respectively, they can all be combined to create a full correlation map that is used for identifying the location of features that match the template 300, as will be described later.

According to various exemplary embodiments of the present invention, the novel adaptive template decomposition method uses an integral projection method for an adaptive series of 1D projections (or 1D characterizations) of a 2D template. In order to provide robust template matching and/or good template matching position accuracy, it can employ more than one template subdivision and corresponding 1D projection in each of the horizontal and/or vertical directions. Using adaptive subdivisions and corresponding projections preserves critical information from the original 2D template to thereby improve the accuracy in template matching. The numbers of horizontal and vertical projections do not have to be equal (as in the example of FIG. 4, which produces two horizontal projections and three vertical projections); the numbers of horizontal and vertical projections can be adjusted based on the shape of the template (e.g., a long, thin vertical template can be sampled more heavily in the vertical direction than in the horizontal direction). Further, any of the horizontal template subdivisions may overlap with each other, and any of the vertical template subdivisions may overlap with each other. One of the advantages of the adaptive template decomposition technique is that it may be used to adjust the number and sizes of the horizontal/vertical template subdivisions so as to achieve both good matching accuracy and speed improvement in each application. For example, regarding the problem previously described with reference to FIG. 3, it should be appreciated that if the template feature portions 302, 304, respectively, were rearranged to the positions 302', 304', respectively, as indicated by the dashed outlines in FIG. 3, by providing two subdivisions 320, 322 as previously described with reference to FIG. 4, the difference in the template pattern would be reflected in the two corresponding horizontal projections H1, H2. Accordingly, the different template configurations would be properly distinguished, for proper matching, but time-consuming full 2D correlation techniques would still be avoided.

Figure 7:
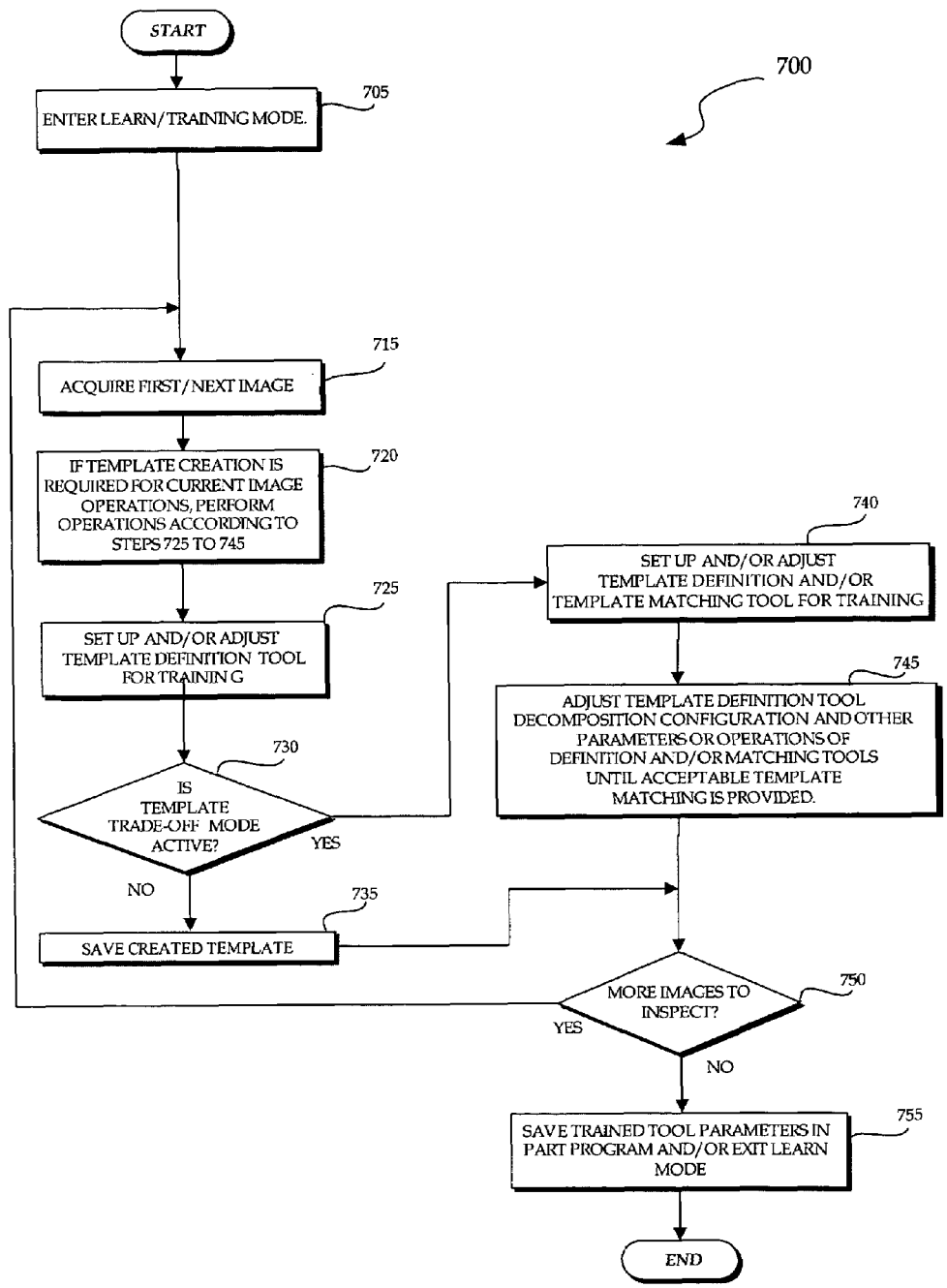
FIG. 7 is a flow diagram illustrating overall operations to be performed during learn mode of a machine vision inspection system, in accordance with one aspect of the present invention.
Figure 8:
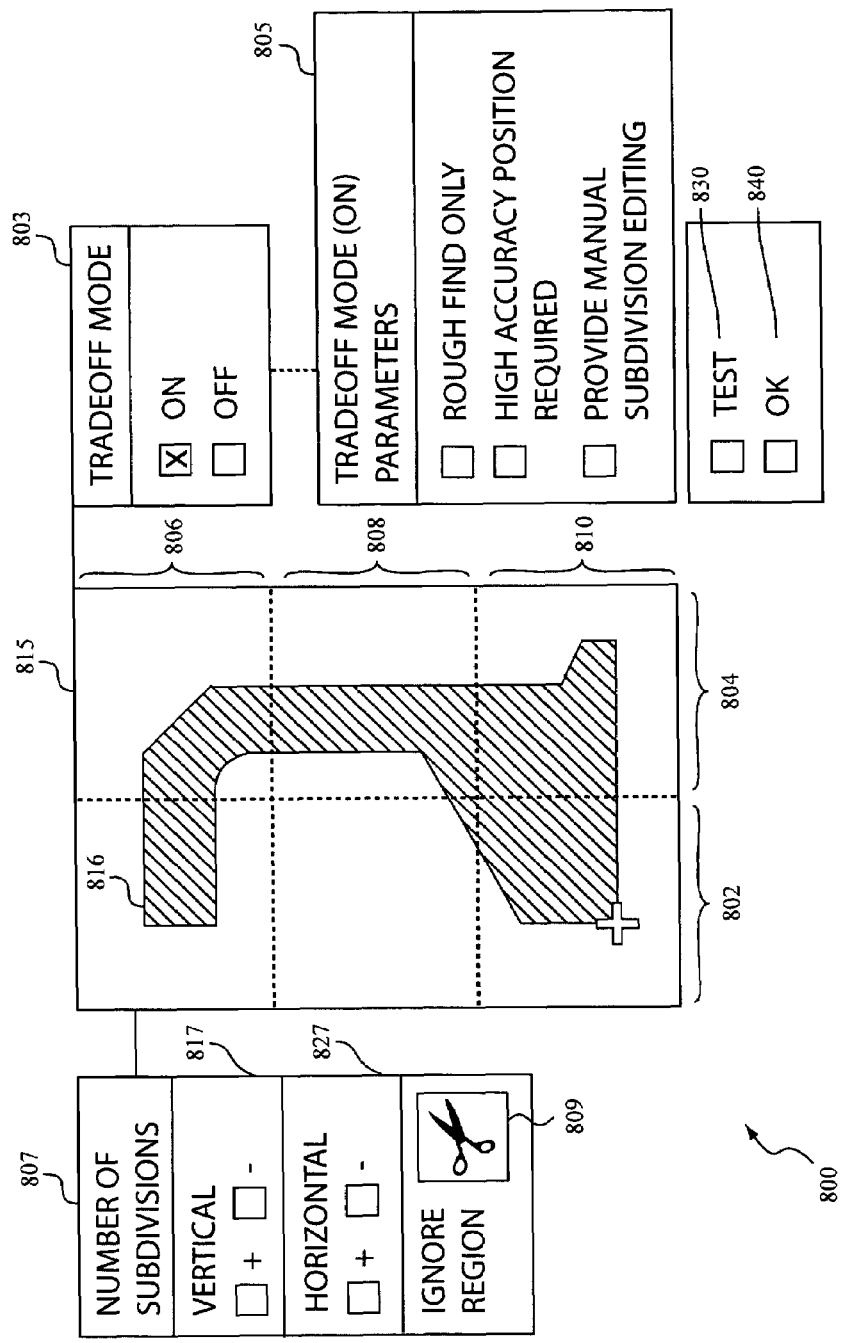
FIGS. 8-10 are screenshots illustrating examples of a template definition tool GUI, suitable for permitting the user to determine and define a desired template decomposition configuration in accordance with one aspect of the present invention.
Figure 9:
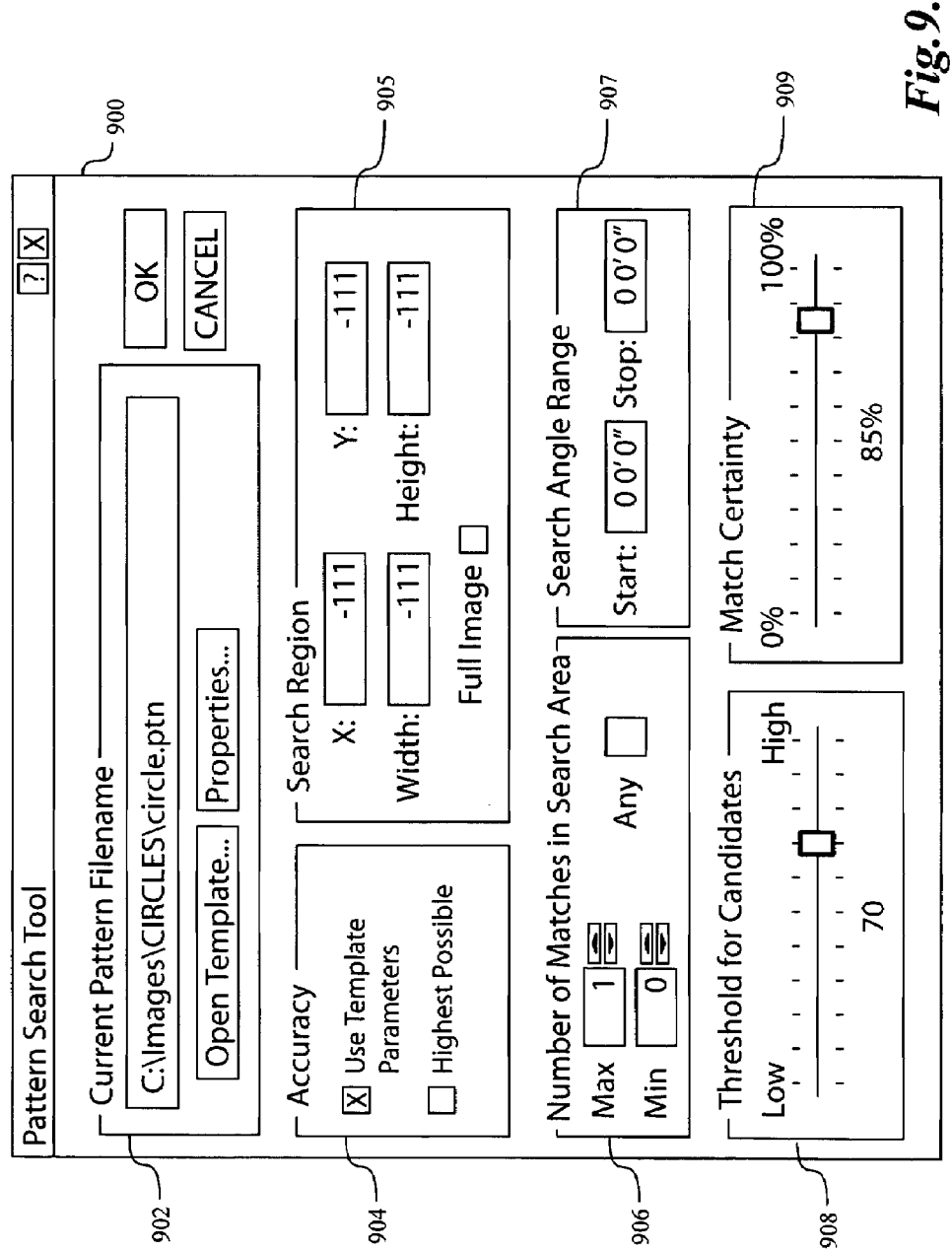
Figure 10:
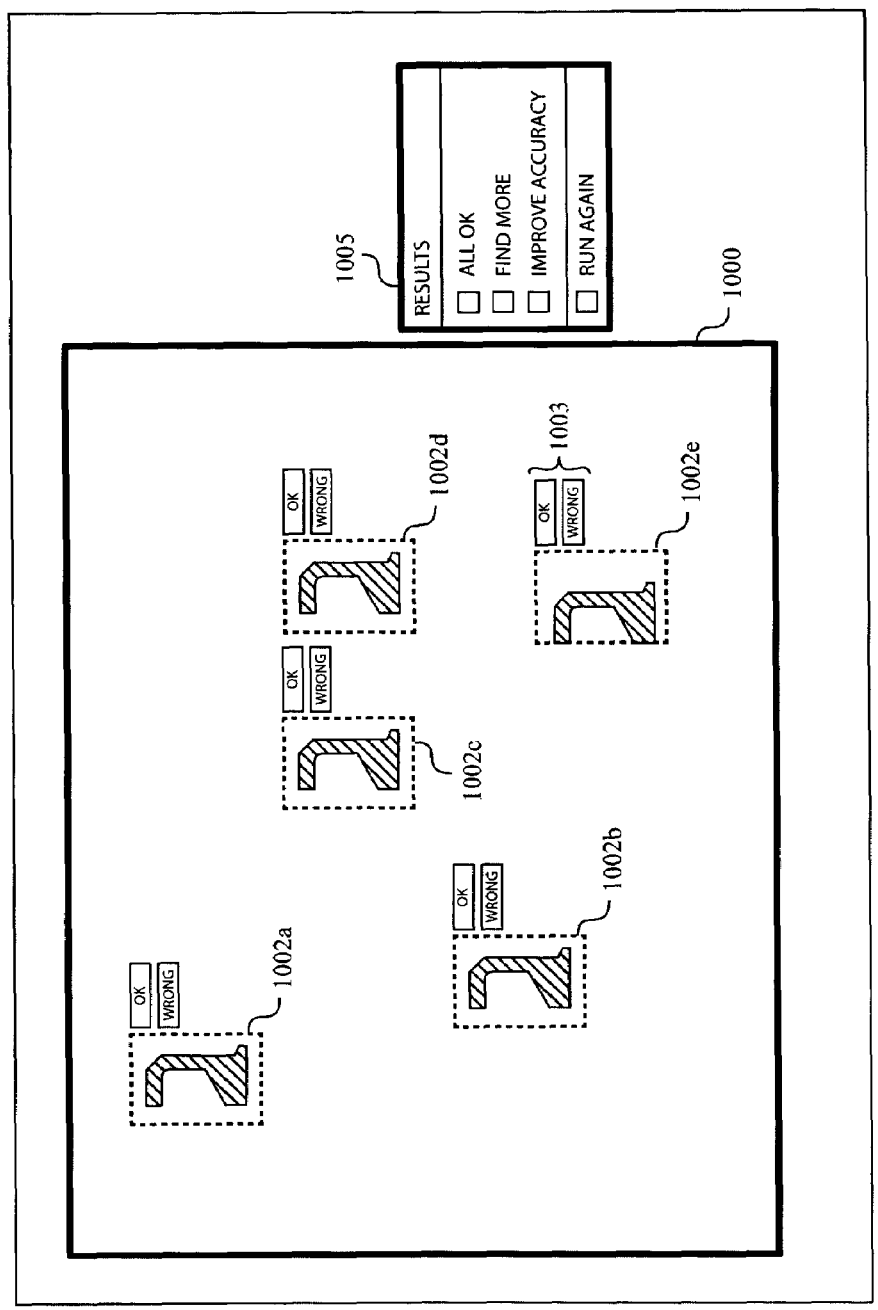

FIG. 7 is a flow chart illustrating an overall routine 700 to be performed during learn mode of a machine vision inspection system, which includes operations directed to creating a template using the adaptive template decomposition method according to one aspect of the present invention. At block 705, the machine vision inspection system enters into learn mode or training mode. At block 715, the routine acquires a first input (workpiece) image. At block 720, if it is determined that template creation is required for an analysis of the current image, operations according to the following blocks 725-745 are to be performed. Specifically, at block 725, a template definition tool (e.g., 148 in FIG. 2) is set up or adjusted to define a 2D template. The template definition tool 148 performs various image processing operations and provides the GUI, as shown in FIGS. 8-10 to be described later, for defining a template. At block 730, it is determined whether template trade-off mode is active. Generally, the template creation video tool 148 may operate in either trade-off mode or default mode. In trade-off mode, the tool adaptively decomposes a 2D template into multiple horizontal and/or vertical template subdivisions that provide a desirable trade-off between speed and matching robustness and position accuracy. In default mode, the tool may sacrifice potential speed increases, and simply use the original 2D template to perform a conventional template matching method using full 2D correlation techniques, for example. If template trade-off mode is not active, i.e., if the template definition tool is in default mode, then in block 735, the original 2D template and any associated parameters are saved. If, on the other hand, template trade-off mode is active, then in block 740, in various embodiments the template definition tool and/or the template matching tool (145 in FIG. 2) is/are set up or adjusted or configured for adaptively decomposing the 2D template into multiple template subdivisions that achieve the desired trade-off between speed and accuracy.

Specifically, in step 745, the decomposition configuration of the original template as defined in the template definition tool, as well as other parameters used to determine the template matching position or operations of the template definition tool 148 and/or the template matching tool 145, are adjusted until acceptable template matching results are provided (while also providing sufficiently high speed template matching, if desired). For example, in one exemplary embodiment, the template definition tool 148 may be used to define the template decomposition configuration (e.g., the template subdivisions and/or the respective template subdivision projections or other 1D characterizations), and the template matching tool 145 may be used to carry out the actual template matching for the one or more decomposition configurations or set of template subdivisions defined by the template definition tool 148 (e.g., the respective horizontal and vertical pseudo-image generation corresponding to the respective template subdivision projections or other 1D characterizations, the corresponding respective correlation sub-map generation, and the full correlation map generation and template matching analysis.) The matching results for a template decomposition configuration may then be evaluated by a user, or by an automatic decomposition configuration evaluation routine, to determine a decomposition configuration that provides a desired trade-off between speed and accuracy, as will be more fully described later in reference to FIG. 5. Then, the determined template decomposition configuration, as well as other parameters used to perform the desired template matching operations, are saved. In block 750, it is determined whether there are more images to be inspected. If so, the routine 750 returns to block 715 and processes the new (next) image. If there are no more images to be inspected, then in block 755, the template matching parameters to be used by the template matching tool 145 during run mode of operations, including the determined desired template decomposition configuration, are stored in a part program. The machine vision inspection system may then exit the learn mode. It will be appreciated that the allocation of various operations and/or stored parameters or results of a template definition tool, or a template matching tool, may be different in different embodiments. Such allocations are generally a programming choice that may be arbitrary, or governed by certain advantages or features desired in certain applications. Accordingly, their description herein is exemplary only, and not limiting. Furthermore, in various embodiments, the operations of the template definition tool and the template matching tool may be merged into a single tool and/or indistinguishable.

Figure 5:
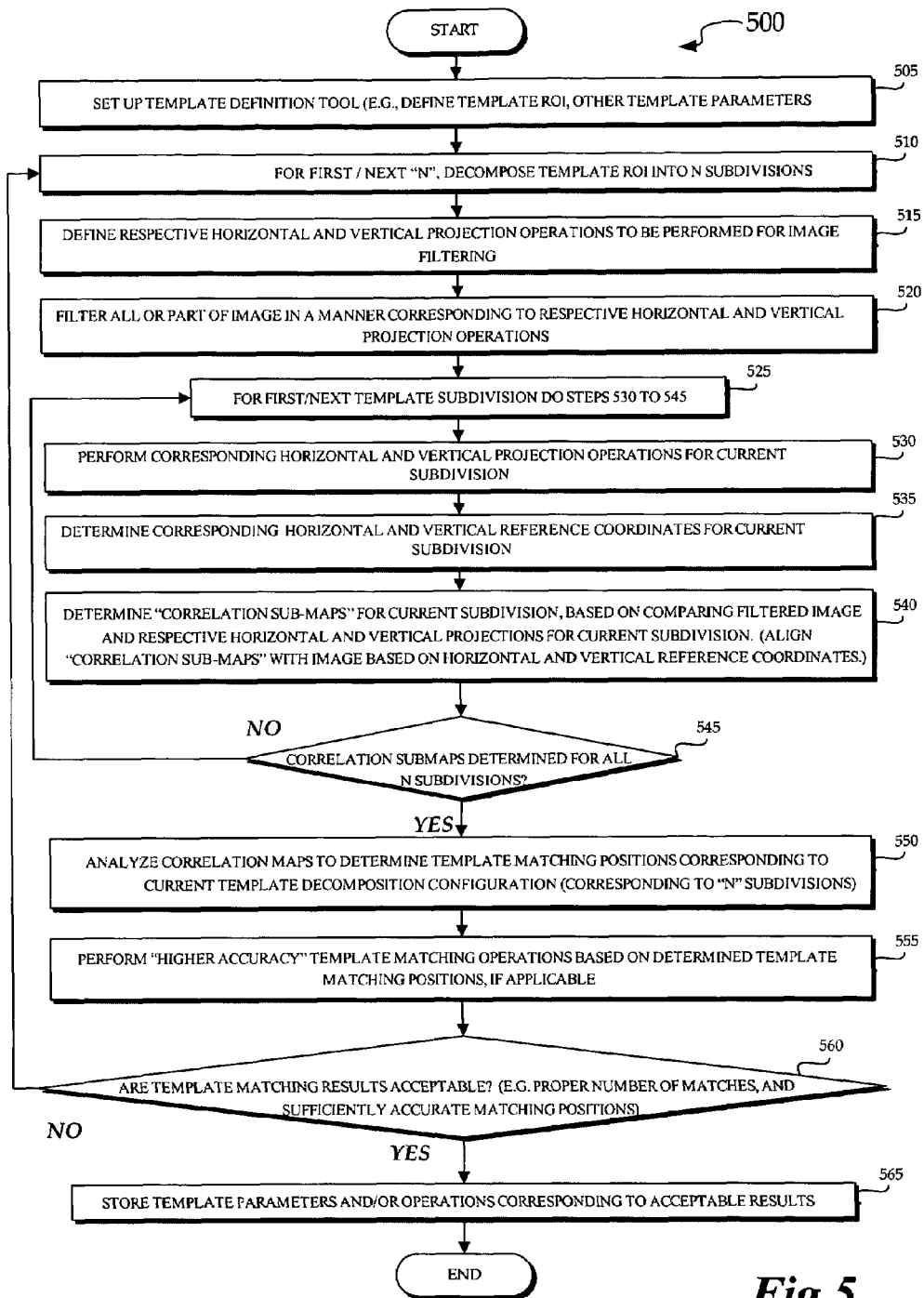
FIG. 5 is a flow diagram illustrating a method of defining a template using an adaptive template decomposition technique, to be performed during learn mode operations of a machine vision inspection system, in accordance with one aspect of the present invention.

FIG. 5 is a flow chart illustrating one embodiment of an adaptive template decomposition technique routine 500 in accordance with the present invention. The routine 500 generally corresponds to blocks 725-745 and 755 of FIG. 7. In FIG. 5, at block 505, the template definition tool is set up. Specifically, a template region-of-interest (ROI) and other template parameters, such as a desired maximum number of pixels in a template subdivision and/or a desired number of template subdivisions to be created, may be defined based on user input and/or, optionally, default values. At block 510, for a first or next value of "n", the template ROI is decomposed into "n" sub-regions or subdivisions. In accordance with various exemplary embodiments of the present invention, the template decomposition configuration or the number of horizontal and vertical template subdivisions to be produced is determined based on one of: (a) a desired maximum number of pixels in a subdivision based on user input or a default value (e.g., a desired number of pixels in each of the horizontal or vertical direction), (b) a desired number of subdivisions based on user input or a default value, and (c) a spatial frequency analysis performed on the template.

At block 515, respective horizontal and vertical projection operations to be performed for producing 1D characterizations of the 2D template, and for input image filtering, are defined based on the respective horizontal and vertical template subdivisions. At block 520, all or part of an input image is filtered in a manner corresponding to the respective horizontal and vertical projection operations, to create respective horizontal and vertical pseudo-images. As previously outlined, the number of respective horizontal and vertical pseudo-images required will depend on the number of different dimensions used for the horizontal and vertical subdivisions. At block 525, for each of the horizontal/vertical template subdivisions, the following blocks 530-545 are to be performed.

Specifically, in block 530, for the current template subdivision, corresponding horizontal or vertical projection operations are performed to create a 1D characterization (e.g., 1D projection) of the subdivision. As outlined previously, the method of determining a respective 1D characterization must generally correspond to the method used to determine the corresponding respective pseudo-image that will be correlated with the that respective 1D characterization. At block 535, for the current template subdivision, corresponding horizontal or vertical reference coordinates are determined.

Regarding horizontal and vertical reference coordinates, also referred to as (x,y) reference coordinates, it will be appreciated that one goal of a template matching operation is that various template subdivisions should all contribute to identifying a single position where a workpiece feature in an input image best matches the complete template. In one sense, the coordinate location attributed to a 2D workpiece feature may be arbitrary. That is, provided that a defined "reference" point on the workpiece feature (or at a known position relative to a workpiece feature) is defined in terms of a desired coordinate system, other measurements or dimensions of the 2D workpiece feature may be determined relative to the reference point and thus to the desired coordinate system. It will be appreciated that a similar kind of coordinate "bookkeeping" may be applied for the template subdivisions. That is, the overall template may have a defined reference point that will map to, or be congruent with, the corresponding reference point in the workpiece image that is reported as the "template matching coordinate". Similarly, each of the template subdivisions may have subdivision reference coordinates that are determined relative to the template reference point and thus may be determined relative to the desired coordinate system. It will be appreciated that subdivision reference coordinates depend on the subdivision location relative to the overall template, and they may be used to insure that the various filtering and/or correlation operations related to the subdivisions, and/or correlation sub-maps combining operations, and the like, are performed and/or combined in a geometrically appropriate and consistent manner. The need for, and manner of achieving, such appropriate coordinate relationship bookkeeping, storing filter operation results at the appropriate locations in the pseudo-images, and the like, will be understood by one skilled in art, having the benefit of this disclosure.

At block 540, correlation sub-maps are created for the current template subdivision, based on correlating the corresponding respective pseudo-images (as created in block 520) with the corresponding respective horizontal or vertical 1D projections or characterizations (as created in block 530). The relationship or alignment of each full correlation sub-map to each other, and/or to the overall template, and/or to the input image may be tracked based on the subdivision reference coordinates, as previously outlined. At block 545, it is determined whether correlation sub-maps have been created for all of the "n" subdivisions. If not, the routine returns to block 525.

If all correlation sub-maps have been created, the routine proceeds to block 550, where these correlation sub-maps may be combined into a full correlation map which is then analyzed to determine the template matching position(s) resulting from and corresponding to the current template decomposition configuration (i.e., corresponding to the "n" subdivisions). In block 555, if applicable, "higher accuracy" template matching operations may be performed based on the template matching position(s) as determined in block 550. For example, since the template matching positions as determined in block 550 are known with reasonable accuracy, a full 2D template correlation operation (e.g., a known high-accuracy type of template correlation) may be performed over a very small search range in a short time, for example, over a range of a few pixels in each directions around the positions as determined in block 550, to provide improved template matching position accuracy.

In a decision block 560, it is determined whether the template matching results are acceptable. For example, it is determined whether a proper number of matches have been identified and/or sufficiently accurate matching positions have been identified based on the user's visual verification (e.g., as outlined in reference to FIG. 10) or by an automatic decomposition configuration evaluation routine. For example, an automatic decomposition configuration evaluation routine could analyze the variability (uniformity) of each of the correlation sub-maps and/or the resulting full correlation map to determine if the sub-maps and/or the full correlation map contain "strong enough" correlation peaks or, conversely, whether they are overly uniform. If "strong enough" correlation peaks are absent, or the map(s) are overly uniform, their "resolving power" in the template search is low and therefore the number of subdivisions should be increased to produce more significant peaks in the correlation sub-maps and/or the full correlation map. If the template matching results are not acceptable, the routine 500 returns to block 510 and again decomposes the template ROI into a different configuration. In exemplary embodiments, the value of "n" may be increased when returning to the block 510, such that the different configuration may include further subdivisions, for example, at least one additional subdivision along at least one of the horizontal or vertical directions. If, on the other hand, the template matching results are acceptable, then in block 565, the template parameters and/or operations corresponding to the acceptable matching results are stored in a part program, for use in run mode template matching operations of the machine vision inspection system, and the routine ends.

It will be appreciated that the template parameters and/or operations stored in the part program may comprise data defining the layout of the plurality of subdivisions corresponding to the acceptable template matching results, and/or data including the respective 1D characterizations used to determine the acceptable matching results along with data sufficient to determine the corresponding respective pseudo-images that will be correlated with the that respective 1D characterizations during run mode. More generally, data comprising any combination of template parameters and/or operations may be stored that allows similar matching results to be obtained corresponding to a similar template decomposition configuration during run mode.

In various exemplary embodiments of the present invention, in block 560, the determined template matching position(s) are used to display the template pattern overlaid on a real-time display of the workpiece feature in a corresponding position(s), and the user determines whether the determined template matching position(s) is acceptable. (See FIG. 10, to be described later). The template matching position may also be displayed as a numerical coordinate result. If the user determines that the determined template matching position is unacceptable, returning to block 510, at least one of the number of horizontal and vertical template subdivisions is increased, and the template matching operations are repeated based on the increased number of template subdivisions.

In various other exemplary embodiments of the present invention, the user may "step through" a plurality of respective displays of the determined template matching position results corresponding to respective numbers of template decomposition subdivisions and observe the corresponding respective template matching positions overlaid on a real-time display of the workpiece feature (and/or the corresponding numerical coordinate results), and accept or reject each result. In other words, blocks 510-560 of FIG. 5 are repeated a certain plurality of times, regardless of whether each time in block 560 the template matching results are found to be acceptable (e.g., according to some default criteria) or not. In accordance with a further aspect of the invention, when a plurality of respective results are accepted by the user, the accepted result corresponding to the minimum number of subdivisions (resulting in the maximum speed advantage) is automatically identified and incorporated into a part program to be used for inspecting the corresponding workpiece during run mode operations. This method may be based on an analysis of diminishing improvements in template matching position accuracy as the number of subdivisions is increased.

Figure 6:
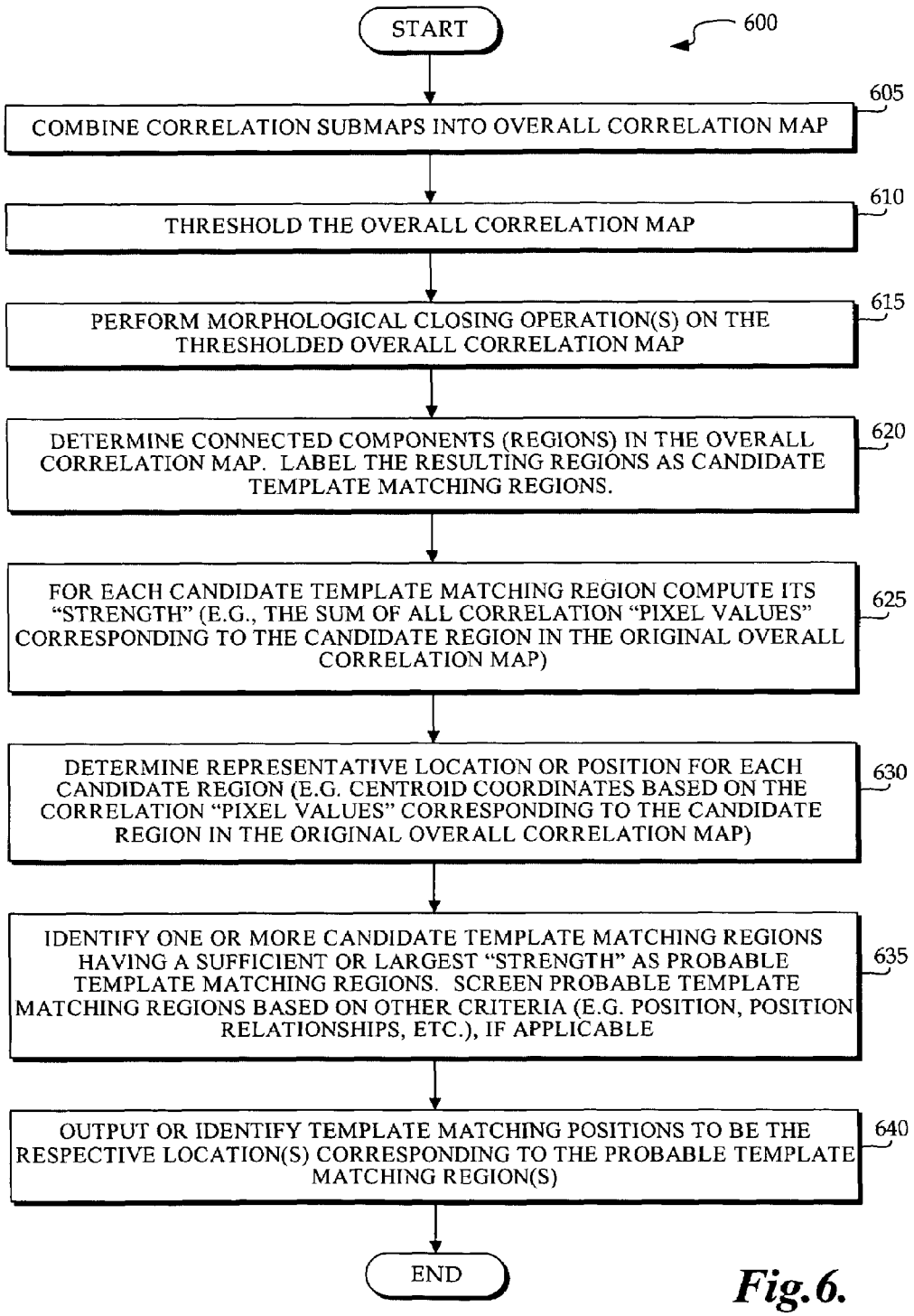
FIG. 6 is a flow diagram illustrating a method of analyzing a correlation map to identify template matching position(s)

FIG. 6 is a flow chart illustrating one exemplary embodiment of a correlation map analysis routine 600, used to identify template matching position(s) in accordance with the present invention. (See block 550 in FIG. 5). At block 605, one or more correlation sub-maps are combined into an overall or full correlation map. The sub-maps may be combined in any suitable manner, such as by addition or by using known fuzzy logic or neural programming training methods. At block 610, the overall correlation map is thresholded. Optionally, a smoothing operation (e.g., average, Gaussian or median filtering) may be performed on the correlation map, to remove spurious noise, prior to the thresholding operation. At block 615, morphological closing operation(s) (dilation followed by erosion) are performed on the thresholded overall correlation map to close any small holes therein. At block 620, connected components (regions) analysis is performed to identify local sets of qualifying pixels in the overall correlation map, and the resulting regions are labeled as candidate template matching regions. At block 625, for each candidate template matching region, its "strength" is computed, for example, by summing all correlation "pixel values" in the candidate region. It should be appreciated that the "strength" of a candidate region may be indicated by a large sum (a large peak) when the underlying correlation operation produces a high correlation value corresponding to a good match, for example when a multiplicative correlation operation is used. Conversely, the "strength" of a candidate region may be indicated by a small sum (a large valley) when the underlying correlation operation produces a small correlation value corresponding to a good match, for example when an absolute difference correlation (ADC) operation is used. In block 630, a representative location or position for each candidate region is determined, for example, by determining the region centroid coordinates based on the correlation value-weighted "pixel locations" in the candidate region. In block 635, one or more candidate template matching regions having a sufficient or the largest "strength" is/are identified as probable template matching region(s). If applicable, the probable template matching region(s) are screened based on other criteria, such as their positions in comparison to an expected or "as designed" feature position on the workpiece, position relationships with respect to each other, size of the candidate matching regions, etc. In block 640, the representative location(s) corresponding to the respective probable template matching region(s) are identified and output as the template matching positions.

In accordance with various exemplary embodiments of the present invention, after the respective horizontal and vertical correlation sub-maps are combined to form a full correlation map, one or more of the correlation sub-maps may be selectively combined to determine which combination of the sub-maps sufficiently closely corresponds to the full correlation map. If a combination of less than all of the correlation sub-maps is found to sufficiently closely correspond to the full correlation map, then such a combination of sub-maps may be used for template matching instead of the full correlation map, and the template matching speed or throughput may increase correspondingly. In other words, it is possible to evaluate the template matching positions that result from a combination of "less than all" correlation sub-maps and discard the sub-maps that do not contribute significantly to improving the accuracy of the template matching position(s). Of course, if a sub-map is "discarded" then none of the operations that are unique to the creation of that sub-map are required to be performed. For example, at run time, the 1D characterization of the subdivision related to that sub-map, and any filtering and correlation operations uniquely related to that sub-map, may be omitted. Correlation sub-maps may be discarded based on analysis of their variability or uniformity (in the absence of significant correlation peaks or valleys, they may be discarded) as previously outlined. They may also be discarded based on systematic trial and error testing. In any case, the sufficiency of a combination of sub-maps can be tested by determining and evaluating a template matching position results, and if it is acceptable, only the corresponding subdivisions and the corresponding operations need to be used in a part program to be executed in run mode. This approach may be particularly useful when the user makes a very large template, in which perhaps only a small number of features are really contributing to the match (for example, if the central region of the large template is one uniformly dark mass, this region may not provide or contribute to the match). Selecting and using only those sub-maps that include some spatial variations may achieve approximately the same overall template matching results as using the full correlation map, with an added speedup advantage.

The number of pixel-based operations required to carry out the adaptive template decomposition technique according to one aspect of the present invention can be calculated as follows. For an image of size M by N pixels and a template of size T by S pixels, using "A" number of horizontal template subdivisions and "B" number of vertical template subdivisions, the approximate number of pixel-based operations required to compute the final (full) correlation map can be obtained based on the following:

1. $(T/A)*S*A=T*S$ operations to obtain all of the horizontal template projections Hi (where $1 \leq i \leq A$).
2. $T*(S/B)*B=T*S$ operations to compute all of the vertical template projections Vi (where $1 \leq i \leq B$).
3. $3*M*N$ operations to smooth (filter) the input image horizontally, when using a partial summation method for example, with a filter of width T/A. Smoothing may be done once before all the subsequent correlation operations are performed relative to the respective horizontal template projections (see block 520 in FIG. 5).
4. $3*M*N$ operations to smooth the input image vertically, using the partial summation method for example, with a filter of height S/B. Smoothing may be done once before all the subsequent correlation operations are performed relative to the respective vertical template projections (see block 520 in FIG. 5).
5. $A*M*N*S$ operations to correlate the horizontally smoothed input image with all of the horizontal template projections Hi to create "A" number of horizontal correlation sub-maps.
6. $B*M*N*T$ operations to correlate the vertically smoothed input image with all of the vertical template projections Vi to create "B" number of vertical correlation sub-maps.
7. $(A*B-1)*M*N$ operations to combine (e.g., add) all of the $A*B$ horizontal and vertical correlation sub-maps.

The total number of operations required, therefore, is $2TS+MN[6+AS+BT+(AB-1)]$, which can be simplified to: $2TS+MN(AS+BT+AB+C)$, where $C<<T, S$. When compared to the full 2D correlation type template matching, the proportion in terms of the number of operations required is $[2TS+MN(AS+BT+AB+C)]/(MNTS)$. The first component of the sum $(2TS)/(MNTS) \approx 0$, so it can be ignored. Also, C is expected to be much smaller than the three other components of the sum, so it can be ignored. Thus, the proportion becomes approximately $(AS+BT+AB)/(TS)$. In other words, the template matching method using the novel adaptive template decomposition technique is approximately $(TS)/(AS+BT+AB)$ faster than the full 2D correlation type template matching method. $(TS)/(AS+BT+AB)$ is herein termed the "speedup formula."

As the limiting case, if T horizontal projections and S vertical "projections" are used (i.e., every single template column and row is treated as a projection), the performance of the adaptive template decomposition method degrades to $(TS)/(TS+ST+TS)=1/3$. In other words, the adaptive template composition method becomes 3 times slower than the full 2D correlation type template matching method. This is caused by the fact that using such dense "projections" results in the correlation of the full 2D template being computed twice (first column by column, then row by row). Therefore, using numbers A and B that are comparable with the template dimensions T and S will not result in any speed advantages. However, in various exemplary applications, $A<<T$ and $B<<S$, and therefore sufficient speed advantages can be obtained while at the same time sufficiently accurate template matching results are ensured due to the use of multiple template subdivisions in the horizontal and/or vertical directions.

As an example, for 70×70 template and two projections in both horizontal and vertical directions, the speedup will be calculated according to the speedup formula as: $70*70/(2*70+2*70+2*2)=4900/284=17.25$ times, which is a significant speed advantage over the full 2D correlation type template matching. The reasonable numbers of horizontal and vertical projections to result in significantly faster template matching depend on the size of the template and the amount of detail in the template: Larger templates may be sampled with more projections than smaller templates without losing the speedup advantage; conversely, templates with few details may be sampled with fewer projections than templates with many fine details without losing the reliability/accuracy with respect to the standard 2D matching. In further embodiments of the present invention, the speedup formula, (TS)/(AS+BT+AB), may be used to dynamically estimate the values of A and B to meet the desired speedup advantage. In still further embodiments, the speedup formula can be used to find a suitable number "N" of pixels to be included in a template subdivision in the horizontal or vertical direction. Assuming some target speedup to be achieved, say 10×, and for known template dimensions (T by S), one could compute N to achieve the target speedup according to A=T/N and B=S/N, where N is smaller than both T and S. The resulting A and B represent the numbers of projections in each direction necessary to achieve the target speedup, or more precisely, the maximum possible numbers of projections that can provide the target speedup while ensuring that the template is sampled uniformly in both directions since N is the same for both directions. The general theoretical speedup formula for template projections taken every N pixels in both vertical and horizontal directions is $(N^2)/(2N+1)$, which can be roughly approximated by N/2. In practice, the speedup achieved in an implementation may actually be smaller and closer to N/3, due to the overhead required for allocation, processing, combining and de-allocation of the correlation sub-maps. Therefore, in practice, creating template projections both horizontally and vertically every 12 pixels of the original template, for example, may provide approximately a 4-fold actual speedup in processing with respect to the standard 2D template matching.

Regarding partial summation techniques, referred to above, applicable techniques known to one skilled in the art of image processing may be used. In general, using partial summation, access to image data is speeded up at the expense of a preprocessing stage, which generates a table of partial sums. This table may then be used to calculate the sum of gray levels in any arbitrary rectangular region of an image, which may be useful for various image filtering operations. Partial summation techniques can be understood according to teachings found on pages 16-18 of "Faster Spatial Image Processing Using Partial Summation," Technical Report CUED/F-IN-FENG/TR.245, Cambridge University Engineering Department, January 1996. It is similar to the use of vector dominance to perform range searching, a technique used in computational geometry, for example, as described in *Computational Geometry: An Introduction*, by Preparata and Shamos, Springer-Verlag, 1985.

In various exemplary embodiments, adaptive decomposition of a template may comprise determining a desired number of horizontal subdivisions having equal horizontal dimensions, and/or a desired number of vertical subdivisions having equal vertical dimensions, such that a minimum number of correlations pseudo-images need to be generated, as previously outlined. As previously mentioned, any of the horizontal template subdivisions may overlap with each other, and any of the vertical template subdivisions may overlap with each other. Overlapping horizontal subdivisions may make it easier to provide horizontal subdivisions that have equal horizontal dimensions and overlapping vertical subdivisions may make it easier to provide vertical subdivisions that have equal vertical dimensions. In various other exemplary embodiments, the boundary locations of respective template subdivisions may be adjusted in response to the amount of features or shape information (e.g., edge pixels) present in a given template subdivision. In other words, a relatively large subdivision may be used to encompass a relatively large smooth (featureless) template area and more template subdivisions may be used in template areas containing more details. To determine which template areas contain more details, edge pixels can be detected and their density in various template areas can be compared. When subdivisions having different sizes are used, the number of correlation pseudo-images that must be determined will increase correspondingly, as previously outlined.

FIG. 8 is a sample screenshot of the template definition video tool 800, illustrating one example of a user interface that permits the user to define and/or confirm a template decomposition configuration. In the embodiment shown in FIG. 8, the template definition video tool 800 includes a template 815, that coincides with a template region of interest, which may be indicated by solid lines or other indicators in the tool display. The template 815 includes a template feature 816. The template definition video tool 800 may include a "TEST" button 830, which tests the current parameters of the template definition tool 800 when selected, for example, as outlined below with reference to FIG. 10. It may also include an "OK" button 840, which accepts and stores the current parameters of the template definition video tool 800, when selected.

In this example, the template definition video tool 800 is in template trade-off mode, as indicated in a TRADEOFF MODE window 803, which may include an "ON" enunciator and/or control button and an "OFF" enunciator and/or control button. Thus, the template 815 is decomposed into multiple horizontal and/or vertical template subdivisions according to suitable criteria. In the illustrated example, the template 815 is decomposed into two horizontal template subdivisions 802 and 804 and three vertical template subdivisions 806, 808, and 810, which may be indicated by dashed lines or other indicators in the tool display. A TRADEOFF MODE PARAMETERS window 805 may be active when the template definition video tool 800 is in template trade-off mode. Otherwise, optionally, the TRADEOFF MODE PARAMETERS window 805 may be inactive and/or hidden from view. The TRADEOFF MODE PARAMETERS window 805 may permit the user to select a desired sub-mode that determines the parameters that govern the tradeoffs made when defining a template using the template definition video tool 800. For example, one of the sub-modes, within the template trade-off mode, may be a "ROUGH FIND ONLY" sub-mode, as indicated by the ROUGH FIND ONLY enunciator and/or control button. Selection of the ROUGH FIND ONLY sub-mode indicates that a relatively low level of accuracy in template matching is sufficient. Accordingly, tool parameters may be set such that the template is defined to include relatively few template subdivisions, such that the template matching speed or throughput is enhanced, for example. A second sub-mode within the template trade-off mode may be the "HIGH ACCURACY POSITION REQUIRED", as indicated by the HIGH ACCURACY POSITION REQUIRED enunciator and/or control button. Selection of the HIGH ACCURACY POSITION sub mode indicates that a relatively high level of accuracy in template matching is required. Accordingly, the tool parameters may be set such that the template may be defined to include relatively more template subdivisions, such that the template matching accuracy is enhanced, for example. Exemplary embodiments of these two sub modes will be described later in reference to FIG. 9.

A third sub-mode within the template trade-off mode may be the "PROVIDE MANUAL SUB-REGION EDITING", as indicated by the PROVIDE MANUAL SUB-REGION EDITING enunciator and/or control button. In exemplary embodiments, one feature of this mode is that the numbers of vertical and horizontal subdivisions, respectively, created and displayed may be controlled by a user activating "+" (increase) and "−" (decrease) buttons 817 and 827, respectively, in a NUMBER OF SUB-REGIONS window 807. In exemplary embodiments, unless the user explicitly relocates or adds a subdivision boundary as outlined below, the operation of the template definition video tool 800 may default to adjusting each subdivision to having the same dimensions as the number of subdivisions is changed, for reasons outlined above. In addition, the user may select an "IGNORE REGION" enunciator and/or control 809, for example by positioning a screen cursor over it, holding down a mouse button, and "dragging" a copy of it onto a subdivided area of the template 815 that is to be ignored during matching operations. As one specific example, if a subdivision is completely filled with the featureless "interior area" of a template feature, or is otherwise completely uniform, then the user may wish to explicitly eliminate such a subdivision from the template matching operations, since such a subdivisions will provide little or no information useful for finding the template match.

In exemplary embodiments, one feature of the PROVIDE MANUAL SUB-REGION EDITING sub-mode is that the user can position a screen cursor (not shown) on a vertical or horizontal subdivision boundary indicator, for example one of the dashed lines shown in the template 815, activate the boundary indicator, for example by clicking or holding down a computer mouse button, and then drag or otherwise control the boundary to move it to a new vertical or horizontal position. Alternatively, or additionally, the user may position a screen cursor in the template 815, away from the existing boundary indicators, and "draw" an additional subdivision boundary using any common line drawing technique.

Of course any of the features of the template definition tool 800 outlined above may be provided in an alternate user interface arrangements, under different names, in different combinations, or as one or more features allocated to other video tools that are related to templates or template matching. In addition, features may be added which indicate and/or control the vertical and/or horizontal dimensions of the subdivisions in terms of a number of pixels, N. Such a feature might be provided under the PROVIDE MANUAL SUB-REGION EDITING sub-mode, for example. Since, as stated earlier, the relationship between the N and speedup relative to full 2D template matching is typically N/3, in practical implementation such a feature may be valued by some users. Alternatively, or additionally, features may be added which indicate and/or control the "SPEEDUP", for example, relative to full 2D template matching, and the appropriate dimensions of the subdivisions in terms of a number of pixels, N, would be determined based at least partly on one or more of the speedup relationships described previously. Such a feature might be provided under the ROUGH FIND ONLY sub-mode, for example.

FIG. 9 is a sample screenshot of an exemplary Template Search or Pattern Search Tool window 900, illustrating one example of a user interface that permits the user to define and/or confirm various template matching parameters. The Tool window 900 may appear when template matching operations are requested during manual operation or learning mode operation, or when editing a part program, for example. The Tool window 900 includes seven exemplary parameter windows. A Current Pattern Filename window 902 indicates the current pattern (template) file that is to be used for the template matching operations, and also includes an "Open Template" control button, which may cause a user interface and display similar to that shown in FIG. 8 to be recalled for further adjustment or review of the template definition, and a "Properties" control button, which may cause various parameters associated with the defined template to be displayed in tabular form, or parameter windows, or the like, for further adjustment or review.

An Accuracy window 904 may permit the user to confirm that the accuracy "tradeoff" associated with the defined template should be used, when the "Use Template Parameters" enunciator or control is selected, or to override the defined template and provide the highest possible accuracy, when the "Highest Possible" enunciator or control is selected. For example, when the "Use Template Parameters" enunciator or control is selected, the template matching operations may comprise various methods outlined in this disclosure, based on parameters defined using the template definition tool 800, or the like. When the "Highest Possible" enunciator or control is selected, full 2D template matching may be provided, simply using the template 815 and template feature 816, according to known practices in commercially available systems, for example, and any subdivisions and associated parameters may simple be ignored in such a case.

A Search Region window 905 may permit the user to either designate that a full image is to be searched, or to define the nominal position (x, y) and the size (Width and Height) of a region within the full image to be searched for a match to the template. The pattern search tool may have an associated user interface (not shown) that allows the user to define a search region of interest on an input image, by positioning and sizing a graphical box, for example. In such a case, the numbers in the Search Region window 905 may initially reflect that defined region of interest, and may then be edited. A Number of Matches in Search Area window 906 may allow the user to set the maximum and minimum numbers of matches to be found in the particular search area, if the expected number of matches can be defined based on the workpiece design, for example. In such a case, the template matching tool operations executed at run time may include routines that access and/or control the correlation strength information and/or threshold settings that have been outlined previously, in order to select the "best" template matches, or increase the number of template matches, to correspond to the expected number of matches in the search region. The user may select "Any" if no maximum or minimum expected number is to be set.

If the template matching operations include the ability to rotate the input image or template over a range of angles to be searched (to match a template feature that may appear at various angles at the time of inspection), then a Search Angle Range window 907 allows the user to define the angular range that is to be searched. Similarly, if the template matching operations include the ability to scale the input image or template over a range of "magnifications" to be searched (to match a template feature that may appear at various sizes at the time of inspection), then a Scale Range window (not shown) may allow the user to define the scale range that is to be searched.

A Threshold for Candidates window 908 may permit the user to adjust the threshold level from "Low" to "High" for identifying template matching position candidates. In such a case, the template matching tool operations executed at run time may include routines that access and/or control the correlation strength threshold settings that have been outlined previously, in order to increase or decrease the number of correlation peaks that are considered as candidate locations for a template match. The threshold may be set, for example, in terms of the "strength" value of each template matching position candidate that is calculated by summing all correlation "pixel values" in the candidate region. To provide one example, if a particular number or range has been determined in the Number of Matches in Search Area window 906, then it may be advantageous to set the threshold level at a relatively low value (so that all potential matching candidates are considered, to decrease the chance of "false negatives" and provide robustness) and let the "Number of Matches" limit the number of actual matches (to provide matching reliability).

A Match Certainty window 909 permits the user to set the certainty level from 0% to 100%. As one example, the certainty level may provide a secondary correlation threshold check when template matching, that is, candidate matches which pass the setting in the Threshold for Candidates window 908 may be rejected if they fail according to the certainty level setting. Raising the certainty level will decrease the occurrence of "false positives", increasing the reliability of the final template matches, when a conservative template matching approach is appropriate. In various embodiments, the certainty level may override the settings in the Number of Matches in Search Area window 906, for example when it is preferred to insure the highest matching reliability and/or detect poor input image quality, or detect deterioration in the quality of the workpiece features that match the template, or the like.

FIG. 10 is a sample screenshot of a user interface display including a pattern or template search region of interest (ROI) overlay 1000, and a user input portion 1005, that may be displayed during learn mode operations and/or in association with training of, or finalizing the parameters of, the template definition video tool 148 (shown in FIG. 2), such as the instance of the template definition video tool 800 described in reference to FIG. 8, and/or the template matching tool 145 (shown in FIG. 2), or such as the instance of the Template Search or Pattern Search Tool window 900 described in reference to FIG. 9. The (ROI) overlay 1000, and user input portion 1005 permit the user to accept or reject the template matching positions resulting from a trial or first template matching operation in learn mode. For example, in learn mode, after defining one or more parameters of the template definition video tool 800, as outlined above, the "TEST" button may be selected, to search for template matches based on the defined parameters, throughout an entire input image. Alternatively, after defining a template, in learn mode, the template matching tool may be tested on a search region of interest. In either case, the (ROI) overlay 1000 may then be displayed showing the matching results, and user input portion 1005 may be shown. The ROI overlay 1000 may encompass either the entire input image, or the search region of interest, if it is defined. In the ROI overlay 1000, in this case, five template matching positions 1002a-1002e are identified, for example by overlaying the template feature at the determined matching positions on the input image. The user may visually confirm (accept) or reject each of the five positions as a correct match by selecting one of "OK" or "WRONG" icons 1003 displayed next to each position. If all matches are correct and their positions are also acceptable, the user may select "ALL OK" in a RESULTS window 1005, and the parameters of the tool that was being trained at the time of the test will be accepted and stored in their current configuration. The ALL OK button may also cause the display to return to, or continue operation from, the operations and/or display immediately preceding the test operation. If some of the matches are rejected by selecting a "WRONG" icon, the user may then select a "RUN AGAIN" icon, in the RESULTS window 1005, to cause the test to be rerun with adjusted template parameters and new results displayed in the ROI overlay 1000. In such a case, in one embodiment, the correlation threshold parameters of the underlying template definition tool may be adjusted or controlled to accept correlation strengths corresponding to the confirmed or accepted matches and to reject correlation strengths corresponding to the rejected matches, for example.

If all matches are correct but one or more of their positions are not acceptable, the user may select an "IMPROVE ACCURACY" icon, followed by a "RUN AGAIN" icon, in the RESULTS window 1005, to cause the test to be rerun with adjusted template parameters and new results displayed in the ROI overlay 1000. In such a case, the parameters of the underlying template definition tool may be adjusted or controlled to increase the number of subdivisions, for example. Alternatively, if a maximum number of subdivisions is reached, full 2D template matching operations may be implemented and the "IMPROVE ACCURACY" icon may be replaced by a "MAXIMUM ACCURACY SHOWN!" notification when the new results are displayed in the ROI overlay 1000.

If the user determines that not all matching features were identified by the template matching operation, the user may then select a "FIND MORE" icon in the RESULTS window 1005, to cause the test to be rerun with adjusted template parameters and new results displayed in the ROI overlay 1000. In such a case, in one embodiment, the correlation threshold parameters of the underlying template definition tool may be adjusted or controlled to accept lower correlation strengths, which will generally cause additional matching features to be identified, if they exist.

Although the various systems and methods outlined above have been described as providing and operating on various images, "pseudo-images", and "maps", for purposes of explanation, it will be appreciated that such images, "pseudo-images", or "maps" essentially comprise data that may be organized, stored, and/or represented mathematically in a variety of alternative configurations. Thus, it should be appreciated that these terms essentially refer to any of a variety of data configurations usable according to the basic teachings disclosed herein, whether or not such configurations are readily recognized as conventional images, "pseudo-images", or "maps". While preferred and exemplary embodiments of the invention have been illustrated and described, it will be appreciated that various changes can be made therein according to the principles of this invention without departing from the spirit and scope of the invention.

The invention claimed is:

1. A method of operating a precision machine vision inspection system to define a template, the template usable for locating matching workpiece features in an image, the precision machine vision inspection system comprising a control system portion and a user interface, the method comprising:
   using the machine vision inspection system to perform the steps comprising:
   (a) setting up a template including a template feature to be matched;
   (b) determining a defined template decomposition configuration to be implemented in the defined template, step (b) further comprising:
      (i) decomposing the template into at least one respective template decomposition configuration;
      (ii) performing respective matching operations for at least one respective template decomposition configuration to determine at least one respective matching result;
      (iii) evaluating at least one respective matching result to determine an acceptable matching result; and
      (iv) determining the respective template decomposition configuration corresponding to the acceptable matching result as the defined template decomposition configuration; and (c) storing the defined template, the defined template including data corresponding to the defined template decomposition configuration, wherein, a template decomposition configuration comprises:

a first number n1 of subdivisions along a horizontal direction, each of the n1 subdivisions having a horizontal dimension; and a second number n2 of subdivisions along a vertical direction, each of the n2 subdivisions having a vertical dimension, wherein at least one of n1 and n2 is at least 2, and the step (b)(ii) of performing respective matching operations, for a respective template decomposition configuration, comprises:

determining a respective one-dimensional horizontal characterization for each of the respective subdivisions along the horizontal direction, to provide n1 one-dimensional horizontal characterizations;

determining a respective one-dimensional vertical characterization for each of the respective subdivisions along the vertical direction, to provide n2 one-dimensional vertical characterizations;

determining at least one respective horizontal pseudo-image;

determining at least one respective vertical pseudo-image;

correlating each respective one-dimensional horizontal characterization with a corresponding respective horizontal pseudo-image, to provide n1 correlation sub-maps;

correlating each respective one-dimensional vertical characterization with a corresponding respective vertical pseudo-image, to provide n2 correlation sub-maps;

determining a full correlation map, based on combining at least 3 correlation sub-maps, the three correlation sub-maps including an least one of the n1 correlation sub-maps and at least one of the n2 correlation sub-maps; and analyzing the full correlation map to determine a respective matching result.

2. The method of claim 1 wherein evaluating the respective matching result comprises at least one of a user evaluating the respective matching result and an automatic decomposition configuration evaluation routine evaluating the respective matching result.

3. The method of claim 1, further comprising at least one of:

a) each of the n1 subdivisions have the same horizontal dimension and the at least one respective horizontal pseudo-image consists of a single horizontal pseudo-image and the single horizontal pseudo-image is correlated with each respective one-dimensional horizontal characterization, and b) each of the n2 subdivisions have the same vertical dimension and the at least one respective vertical pseudo-image consists of a single vertical pseudo-image and the single vertical pseudo-image is correlated with each respective one-dimensional vertical characterization.

4. The method of claim 3, wherein the n1 subdivisions comprise at least two subdivisions that overlap along the horizontal direction.

5. The method of claim 3, wherein the n2 subdivisions comprise at least two subdivisions that overlap along the vertical direction.

6. The method of claim 1, which is performed during learn mode of the precision machine vision inspection system and the defined template is thereafter implemented during run mode of the precision machine vision inspection system, wherein the defined template comprises the respective one-dimensional horizontal characterizations and the respective one-dimensional vertical characterizations, and implementing the defined template during run mode comprises:

determining at least one respective horizontal pseudo-image based on a workpiece image acquired during run mode, the at least one horizontal pseudo-image determined in a manner corresponding to the operations used to determine at least one respective one-dimensional horizontal characterization;

determining at least one respective vertical pseudo-image based on the workpiece image acquired during run mode, the at least one vertical pseudo-image determined in a manner corresponding to the operations used to determine at least one respective one-dimensional vertical characterization;

correlating each respective one-dimensional horizontal characterization with a corresponding respective horizontal pseudo-image, to provide n1 correlation sub-maps;

correlating each respective one-dimensional vertical characterization with a corresponding respective vertical pseudo-image, to provide n2 correlation sub-maps;

determining a full correlation map, based on combining at least 3 correlation sub-maps, the three correlation sub-maps including an least one of the n1 correlation sub-maps and at least one of the n2 correlation sub-maps; and analyzing the full correlation map to determine a respective matching result during run mode.

7. The method of claim 1, wherein decomposing the template into at least one respective template decomposition configuration comprises at least one of a user performing operations to decompose the template into at least one respective template decomposition configuration and a template definition tool performing operations to decompose the template into at least one respective template decomposition configuration.

8. The method of claim 7, wherein the template definition tool performs operations comprising:

decomposing the template into a first number n1 of subdivisions along a horizontal direction, each of the n1 subdivisions having a horizontal dimension; and decomposing the template into a second number n2 of subdivisions along a vertical direction, each of the n2 subdivisions having a vertical dimension;

wherein:

at least one of n1 and n2 is at least 2; and the subdivisions are determined based on satisfying at least one of the criteria of a group comprising: (i) each of the horizontal and vertical dimensions includes a number of pixels that is at most a predetermined maximum number of pixels, (ii) each of the horizontal and vertical dimensions includes at least 4 pixels and at most 30 pixels; (iii) the horizontal and vertical dimensions are determined based on a spatial frequency analysis performed on the template, (iv) the numbers of subdivisions along the horizontal and vertical directions are determined based on providing an acceptable template matching position accuracy, (v) the numbers of subdivisions along the horizontal and vertical directions are determined based on an analysis of diminishing improvements in template matching position accuracy as the number of subdivisions is increased, and (vi) the numbers of subdivisions along the horizontal and vertical directions are determined based on a target speedup with respect to full 2D template matching.

9. The method of claim 1, further comprising operating the user interface to display the template decomposition configuration overlaying the template feature.

10. The method of claim 9, further comprising operating the user interface to adjust the template decomposition configuration overlaying the template feature.

11. The method of claim 9, further comprising:
a) testing the template decomposition configuration overlaying the template feature;
b) displaying a matching result resulting from the test;
c) evaluating whether the matching result resulting from the test is an acceptable matching result; and
d) if the matching result resulting from the test is acceptable, using the template decomposition configuration matching overlaying the template feature as the defined template decomposition configuration.

12. The method of claim 11, further comprising:
if the matching result resulting from the test is not acceptable, repeating the following steps until an acceptable matching result is determined:
determining a template decomposition configuration with an increased number of subdivisions relative to the previously tested template decomposition configuration;
testing the template decomposition configuration with the increased number of subdivisions to determine a corresponding matching result;
evaluating whether the corresponding matching result is an acceptable matching result; and
if the corresponding matching result is acceptable, using the template decomposition configuration with an increased number of subdivisions as the defined template decomposition configuration.

13. The method of claim 1, which is performed during learn mode of the precision machine vision inspection system, and the defined template is thereafter implemented during run mode of the precision machine vision inspection system.

14. A method for defining a desired template to be used for identifying matching workpiece features in a precision machine vision inspection system for inspecting a workpiece, wherein a template comprises n1 horizontal subdivisions and n2 vertical subdivisions where n1 and n2 are a pair of variables, and each of n1 and n2 may be any positive integer, and for any pair of n1 and n2 at least one of n1 and n2 is at least two, the method comprising:
using the machine vision inspection system to perform the steps comprising:
(a) filtering the template in n1 horizontal subdivisions horizontally to create n1 horizontal 1D characterizations, respectively;
(b) filtering the template in n2 vertical subdivisions vertically to create n2 vertical 1D characterizations, respectively;
(c) correlating each of the n1 horizontal 1D characterizations with a corresponding horizontally processed image, to create n1 horizontal correlation sub-maps;
(d) correlating each of the n2 vertical 1D characterizations with a corresponding vertically processed image, to create n2 vertical correlation sub-maps;
(e) combining n1 horizontal correlation sub-maps and n2 vertical correlation sub-maps to obtain a full correlation map; and
(f) evaluating a result determined based on the full correlation map obtained in step (e) to determine whether the n1 horizontal subdivisions and n2 vertical subdivisions provide a desirable result.

15. The method of claim 14, further comprising if step (f) indicates that the n1 horizontal subdivisions and n2 vertical subdivisions do not provide a desirable result, increasing at least one of n1 and n2, and repeating steps (a) through (f).

16. The method of claim 14, wherein the result determined based on the full correlation map comprises a template matching result, steps (a) through (f) are performed for different respective sets of n1 and n2, to identify one or more acceptable sets of n1 horizontal subdivisions and n2 vertical subdivisions that produce an acceptable template matching result, and step (f) comprises identifying one of the acceptable sets where n1+n2 is a minimum among the acceptable sets, as the set of n1 horizontal subdivisions and n2 vertical subdivisions to be used to define the desired template.

17. The method of claim 14, wherein the result determined based on the full correlation map comprises a template matching result, and determining the template matching result comprises:
thresholding the full correlation map;
performing a connected component analysis to identify local sets of qualifying pixels;
labeling each of the identified local sets of qualifying pixels;
attributing a strength value to each respective labeled local set of qualifying pixels based on the correlation values of the qualifying pixels included in the respective set; and
selecting one or more of the labeled local sets as corresponding to template matching positions, based on the strength values.

18. The method of claim 14, further comprising the steps of:
(g) selectively combining one or more, but fewer than all of the, n1 horizontal correlation sub-maps and n2 vertical correlation sub-maps to create one or more combination sub-map(s);
(h) analyzing the one or more combination sub-map(s) in comparison to the full correlation map obtained in step (e) to determine a desired combination sub-map that will provide matching results closely corresponding to the results provided by the full correlation map, and
(i) implementing the desired combination sub-map instead of the full correlation map when defining the desired template.

* * * * *

UNITED STATES PATENT AND TRADEMARK OFFICE
CERTIFICATE OF CORRECTION

PATENT NO. : 7,580,560 B2  Page 1 of 1
APPLICATION NO. : 11/184185
DATED : August 25, 2009
INVENTOR(S) : R. K. Bryll It is certified that error appears in the above-identified patent and that said Letters Patent is hereby corrected as shown below:

| COLUMN | LINE | ERROR |
|---|---|---|
| 27 (Claim 1) | 36 | "an" should read --at-- |
| 30 (Claim 14) | 7 | "(t)" should read --(f)-- |

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,580,560 B2                                       Page 1 of 1
APPLICATION NO.   : 11/184185
DATED             : August 25, 2009
INVENTOR(S)       : Robert K. Bryll It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Fourteenth Day of September, 2010

David J. Kappos
*Director of the United States Patent and Trademark Office*